United States Patent
Carlson

(10) Patent No.: US 10,692,076 B2
(45) Date of Patent: Jun. 23, 2020

(54) DEVICE PAIRING VIA TRUSTED INTERMEDIARY

(71) Applicant: Visa International Service Association, San Francisco, CA (US)

(72) Inventor: Mark Carlson, Half Moon Bay, CA (US)

(73) Assignee: Visa International Service Association, San Francisco, CA (US)

( * ) Notice: Subject to any disclaimer, the term of this patent is extended or adjusted under 35 U.S.C. 154(b) by 177 days.

(21) Appl. No.: 15/878,189

(22) Filed: Jan. 23, 2018

(65) Prior Publication Data
US 2018/0150833 A1    May 31, 2018

Related U.S. Application Data

(63) Continuation of application No. 14/086,836, filed on Nov. 21, 2013, now Pat. No. 9,911,118.
(Continued)

(51) Int. Cl.
  *G06Q 20/38* (2012.01)
  *G06Q 20/02* (2012.01)
  (Continued)

(52) U.S. Cl.
  CPC ............ *G06Q 20/38* (2013.01); *G06Q 20/02* (2013.01); *G06Q 20/18* (2013.01); *G06Q 20/20* (2013.01); *G06Q 20/32* (2013.01)

(58) Field of Classification Search
  CPC ........ G06Q 20/38; G06Q 20/02; G06Q 20/18; G06Q 20/20; G06Q 20/32
  See application file for complete search history.

(56) References Cited

U.S. PATENT DOCUMENTS

| 5,613,012 A | 3/1997 | Hoffman |
| 5,781,438 A | 7/1998 | Lee |

(Continued)

FOREIGN PATENT DOCUMENTS

| EP | 2156397 A1 | 2/2010 |
| WO | 2001035304 A1 | 5/2001 |

(Continued)

OTHER PUBLICATIONS

"Proxy Based Architecture for Secure Website Access from an Untrusted Machine"; Ravi Chandra Jammalamadka, Timothy W. van der Horst Sharad Mehrotra, Kent E. Seamons, Nalini Venkasubramanian (Year: 2006).*

(Continued)

*Primary Examiner* — Patrick McAtee
*Assistant Examiner* — Edgar R Martinez-Hernandez
(74) *Attorney, Agent, or Firm* — Kilpatrick Townsend & Stockton LLP

(57) ABSTRACT

Embodiments are directed at systems, apparatuses, and methods for indirect device pairing through a trusted intermediary. One embodiment is directed to a method including receiving a pairing identifier associated with an untrusted device controller. The method further comprises extracting the pairing identifier from the pairing request, searching a pairing identifier database for a matching pairing identifier, determining an untrusted device controller associated with the matching pairing identifier, and sending the pairing request to the untrusted device controller. The untrusted device controller may identify the untrusted device, associate the pairing identifier with the trusted intermediary, and lock the pairing identifier. The method further comprises receiving a pairing response indicating that the untrusted device is paired with the computer. Accordingly, the trusted device is indirectly paired to the untrusted device and the (Continued)

trusted device is configured to complete a transaction with the untrusted device without communicating transaction information to the untrusted device.

14 Claims, 11 Drawing Sheets

Related U.S. Application Data

(60) Provisional application No. 61/729,190, filed on Nov. 21, 2012.

(51) Int. Cl.
*G06Q 20/18* (2012.01)
*G06Q 20/20* (2012.01)
*G06Q 20/32* (2012.01)

(56) References Cited

U.S. PATENT DOCUMENTS

| | | |
|---|---|---|
| 5,883,810 A | 3/1999 | Franklin |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 * | 12/2001 | Linehan ............ G06Q 20/02 705/65 |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,922,409 B1 * | 7/2005 | Medhat ............ H04L 12/5601 370/395.1 |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,280,981 B2 * | 10/2007 | Huang ............ G06Q 20/02 705/40 |
| 7,287,692 B1 | 10/2007 | Patel |
| 7,292,999 B2 | 11/2007 | Hobson |
| 7,350,230 B2 * | 3/2008 | Forrest ............ G06Q 20/32 705/67 |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 * | 6/2010 | Uzo ............ G06Q 20/06 235/383 |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |

(56) References Cited

U.S. PATENT DOCUMENTS

| | | |
|---|---|---|
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,433,116 B2 | 9/2013 | Davis et al. |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,682,802 B1* | 3/2014 | Kannanari ........... G06Q 20/367 705/64 |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,680,942 B2 | 6/2017 | Dimmick |
| 9,911,118 B2* | 3/2018 | Carlson ................. G06Q 20/02 |
| 10,467,604 B1* | 11/2019 | Dorsch .............. G06Q 20/3223 |
| 2001/0029485 A1 | 10/2001 | Brody |
| 2001/0034720 A1* | 10/2001 | Armes ................. G06O 20/105 705/65 |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1* | 10/2006 | Johnson ................. G06Q 20/02 705/44 |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |

(56) References Cited

U.S. PATENT DOCUMENTS

| | | |
|---|---|---|
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1* | 4/2010 | Wankmueller ......... G06Q 20/12 |
| | | 705/75 |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1* | 1/2011 | Wu .................... G06Q 20/1085 |
| | | 705/43 |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1* | 9/2011 | Varadarajan ....... G06Q 20/1085 |
| | | 705/43 |
| 2011/0246317 A1 | 10/2011 | Coppinger |
| 2011/0258111 A1 | 10/2011 | Raj et al. |
| 2011/0270751 A1* | 11/2011 | Csinger ................... G06F 21/40 |
| | | 705/42 |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1* | 2/2012 | Fuentes ................. G06Q 20/04 |
| | | 705/26.1 |
| 2012/0035998 A1 | 2/2012 | Chien |
| 2012/0041881 A1* | 2/2012 | Basu ...................... G06Q 20/02 |
| | | 705/67 |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1* | 5/2012 | Carlson ................. G06Q 20/02 |
| | | 705/16 |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1* | 8/2012 | Schlesser ........... G06Q 20/3829 |
| | | 705/71 |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder ("J.D."), II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0169526 A1 | 7/2013 | Gai |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |

(56) References Cited

U.S. PATENT DOCUMENTS

| | | |
|---|---|---|
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0278622 A1* | 10/2013 | Sun .................. G06O 20/22 345/589 |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1* | 2/2014 | Fort .................. G06F 21/34 713/182 |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0164243 A1 | 6/2014 | Aabye et al. |
| 2014/0188586 A1 | 7/2014 | Carpenter et al. |
| 2014/0249945 A1 | 9/2014 | Gauthier |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan |
| 2016/0103675 A1 | 4/2016 | Aabye et al. |
| 2016/0119296 A1 | 4/2016 | Laxminarayanan et al. |
| 2016/0132878 A1 | 5/2016 | O'Regan |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0224976 A1 | 8/2016 | Basu |
| 2016/0308995 A1 | 10/2016 | Youdale et al. |
| 2017/0046696 A1 | 2/2017 | Powell et al. |
| 2017/0103387 A1 | 4/2017 | Weber |
| 2017/0186001 A1 | 6/2017 | Reed et al. |
| 2017/0220818 A1 | 8/2017 | Nagasundaram et al. |
| 2017/0228723 A1 | 8/2017 | Taylor |
| 2017/0295155 A1 | 10/2017 | Wong et al. |
| 2017/0364903 A1 | 12/2017 | Lopez |

FOREIGN PATENT DOCUMENTS

| | | |
|---|---|---|
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

"Secure Display and Secure Transactions Using a Handset"; Sandeep Singh Ghotra, Baldev Kumar Mandhan, Sam Shang Chun Wei, Yi Song, Chris Steketee (Year: 2007).*

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

(56) References Cited

OTHER PUBLICATIONS

Wang, U.S. Appl. No. 62/000,288 (unpublished), Payment System Canonical Address Format filed on May 19, 2014.
Sharma et al., U.S. Appl. No. 62/003,717 (unpublished), Mobile Merchant Application filed May 28, 2014.
Kalgi et al., U.S. Appl. No. 62/024,426, (unpublished) Secure Transactions Using Mobile Devices filed Jul. 14, 2014.
Prakash et al., U.S. Appl. No. 62/037,033 (unpublished), Sharing Payment Token filed Aug. 13, 2014.
Hoverson et al., U.S. Appl. No. 62/038,174 (unpublished), Customized Payment Gateway filed Aug. 15, 2014.
Wang, U.S. Appl. No. 62/042,050 (unpublished), Payment Device Authentication and Authorization System filed Aug. 26, 2014.
Gaddam et al., U.S. Appl. No. 62/053,736 (unpublished), Completing Transactions Without a User Payment Device filed Sep. 22, 2014.
Patterson, U.S. Appl. No. 62/054,346 (unpublished), Mirrored Token Vault filed Sep. 23, 2014.
Dimmick, U.S. Appl. No. 14/952,514 (unpublished), Systems Communications With Non-Sensitive Identifiers filed Nov. 25, 2015.
Dimmick, U.S. Appl. No. 14/952,444 (unpublished), Tokenization Request Via Access Device filed Nov. 25, 2015.
Prakash et al., U.S. Appl. No. 14/955,716 (unpublished), Provisioning Platform for Machine-To-Machine Devices filed Dec. 1, 2015.
Wong et al., U.S. Appl. No. 14/966,948 (unpublished), Automated Access Data Provisioning filed Dec. 11, 2015.
Stubbs et al., U.S. Appl. No. 62/103,522 (unpublished), Methods and Systems for Wallet Provider Provisioning filed Jan. 14, 2015.
McGuire, U.S. Appl. No. 14/600,523 (unpublished), Secure Payment Processing Using Authorization Request filed Jan. 20, 2015.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Sabba et al., U.S. Appl. No. 15/011,366 (unpublished), Token Check Offline filed Jan. 29, 2016.
Patterson, U.S. Appl. No. 15/019,157 (unpublished), Token Processing Utilizing Multiple Authorizations filed Feb. 9, 2016.
Cash et al., U.S. Appl. No. 15/041,495 (unpublished), Peer Forward Authorization of Digital Requests filed Feb. 11, 2016.
Le Saint et al., U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Chipman, et al., U.S. Appl. No. 15/265,282 (Unpublished), Self-Cleaning Token Vault, filed Sep. 14, 2016.
Lopez, et al., U.S. Appl. No. 15/462,658 (Unpublished), Replacing Token on a Multi-Token User Device, filed Mar. 17, 2017.
Kaja, et al., U.S. Appl. No. 15/585,077 (Unpublished), System and Method Using Interaction Token, filed May 2, 2017.
Asokan et al., "Authenticating Public Terminals", Computer Networks, vol. 31, Issue 8, Apr. 23, 1999, pp. 861-870.

\* cited by examiner

DEVICE PAIRING VIA TRUSTED INTERMEDIARY

CROSS-REFERENCES TO RELATED APPLICATIONS

This application is a continuation of U.S. application Ser. No. 14/086,836, filed Nov. 21, 2013, which is a non-provisional of and claims priority to U.S. Provisional Patent Application No. 61/729,190, filed on Nov. 21, 2012, the disclosures of which are hereby incorporated by reference in their entirety for all purposes.

BACKGROUND

Consumers are commonly asked to provide sensitive and private information to public devices in order to complete transactions, withdraw money from an automated teller machine (ATM), gain access to a secure location, complete online tasks when away from their trusted computer, or any number of other tasks. However, interacting with public or unknown devices can be risky. Any devices (e.g., ATM, Gas Pump, Vending Machine, Kiosk, POS Device, a friend's computer, etc.) in public can be tampered with in a manner such that the devices may skim or otherwise obtain sensitive information from a user when they engage in a transaction or try to perform any task that requires sensitive or personal information.

However, today's transaction infrastructure, processes, and consumer habits often require consumers to interact with unknown devices and enter private and/or sensitive information (PIN, birthdate, social security number, usernames and passwords, answers to security questions, etc.) into these unknown or public devices. For example, any device that can read credit card information can be tampered with, and unattended devices such as ATMs, vending machines, and gas pumps are especially attractive targets. Consumers cannot be sure these devices have not been tampered with or that their interactions with these devices are not being observed by a camera to capture their personal information. Sometimes these devices are altered externally with hardware being added to these kiosks in order to capture account access details. Alternatively, these devices may be tampered with internally by installation of software on the devices in order to capture secure information.

FIG. 1 illustrates some examples of the many ways in which a public device (e.g., an ATM) may be tampered with such that a consumer's sensitive information may be obtained. As can be seen in FIG. 1A, malicious third parties can install keypad overlays 1B over an ATM keypad 1A to track a consumer's entered PIN or other credentials during an ATM transaction, may install a hidden camera 3B, 4B in a screen cover 3A or brochure holder 4A, and may install a card skimmer 2B over the card reader 2A of the ATM 5. As can be seen in FIG. 1, these devices may be made to look like they are a part of the ATM. Accordingly, consumers may swipe their card and have their account information stolen through the skimmer as well as have their PIN number stolen either through the keypad overlay 1B or by a malicious third party recording the PIN entered during the transaction through a hidden camera 3B, 4B. Many other methods may be implemented to steal such information through a wide variety of different public devices. These examples are provided only as a background on some possible methods in which data entry into a public device may be captured by a malicious third party.

Accordingly, there is a need for a method for a consumer to complete a transaction with a public device without providing sensitive information directly to any of the inputs or outputs of a device.

Additionally, another problem facing consumers is "familiar fraud," or fraud that occurs when an authorized person takes advantage of an account holder's permitted use of an account. For example, a father may give his daughter his payment card and ask them to buy something from the grocery store. At the checkout, the daughter may ask for $20 cashback and pocket it or may charge items they are not authorized to purchase. As such, there is a need for a system that allows an account holder control over a transaction, even from a remote location.

Embodiments of the present invention solve these and other problems, individually and in combination.

SUMMARY

Embodiments of the present invention are directed to methods, apparatuses, and systems for indirectly pairing a trusted device with an untrusted device to perform a transaction without providing sensitive information to the untrusted device.

One embodiment of the present invention is directed to a method of indirectly pairing a trusted device with an untrusted device through an untrusted device controller. The method comprises receiving a pairing request including a pairing identifier associated with the untrusted device controller from the trusted device, extracting the pairing identifier from the pairing request, searching a pairing identifier database for a matching pairing identifier, determining the untrusted device controller associated with the matching pairing identifier in the pairing identifier database, and sending the pairing request to the untrusted device controller. The untrusted device controller identifies the untrusted device, associates the pairing identifier with the trusted intermediary, and locks the pairing identifier. The method further comprises receiving a pairing response from the untrusted device controller indicating that the untrusted device is paired with the computer and sending a pairing confirmation to the trusted device. The trusted device is indirectly paired to the untrusted device and configured to complete a transaction with the untrusted device without communicating transaction information to the untrusted device. In some embodiments, the method further comprises receiving a transaction request from the trusted device and sending the transaction request to the untrusted device controller. The untrusted device controller processes the transaction request and commands the untrusted device to complete the transaction.

Another embodiment is directed to a computer comprising a processor and a computer readable medium coupled to the processor comprising code, executable by the processor for implementing a method of indirectly pairing a trusted device with an untrusted device through an untrusted device controller. The method comprises receiving a pairing request including a pairing identifier associated with the untrusted device controller from the trusted device, extracting the pairing identifier from the pairing request, searching a pairing identifier database for a matching pairing identifier, determining the untrusted device controller associated with the matching pairing identifier in the pairing identifier database, and sending the pairing request to the untrusted device controller. The untrusted device controller identifies the untrusted device, associates the pairing identifier with the trusted intermediary, and locks the pairing identifier. The method further comprises receiving a pairing response from the untrusted device controller indicating that the untrusted device is paired with the computer and sending a pairing confirmation to the trusted device. The trusted device is indirectly paired to the untrusted device and configured to complete a transaction with the untrusted device without communicating transaction information to the untrusted device. In some embodiments, the method further comprises receiving a transaction request from the trusted device and sending the transaction request to the untrusted device controller. The untrusted device controller processes the transaction request and commands the untrusted device to complete the transaction.

Another embodiment is directed to a method of indirectly pairing a trusted device with an untrusted device through a trusted intermediary. The method comprises receiving a pairing identifier request from an untrusted device associated with the untrusted device controller, determining an available pairing identifier, associating the available pairing identifier with the untrusted device, and sending a pairing identifier response including the pairing identifier to the untrusted device to be displayed to a consumer. The method further comprises receiving a pairing request including the pairing identifier from the trusted intermediary, identifying the untrusted device associated with the pairing request, associating the pairing identifier with the trusted intermediary, and locking the pairing identifier from additional pairing requests. The method further comprises sending a pairing notification to the untrusted device and sending a pairing response to the trusted intermediary. The trusted intermediary notifies the consumer that the trusted device is paired, the trusted device is indirectly paired to the untrusted device through the trusted intermediary, and the trusted device completes a transaction at the untrusted device without communicating transaction information to the untrusted device.

Another embodiment is directed to a computer comprising a processor and a computer readable medium coupled to the processor. The computer readable medium may comprise code that is executable by the processor for implementing a method. The method comprises receiving a pairing identifier request from an untrusted device associated with the untrusted device controller, determining an available pairing identifier, associating the available pairing identifier with the untrusted device, and sending a pairing identifier response including the pairing identifier to the untrusted device to be displayed to a consumer. The method further comprises receiving a pairing request including the pairing identifier from the trusted intermediary, identifying the untrusted device associated with the pairing request, associating the pairing identifier with the trusted intermediary, and locking the pairing identifier from additional pairing requests. The method further comprises sending a pairing notification to the untrusted device and sending a pairing response to the trusted intermediary. The trusted intermediary notifies the consumer that the trusted device is paired. The trusted device is indirectly paired to the untrusted device through the trusted intermediary and the trusted device completes a transaction at the untrusted device without communicating transaction information to the untrusted device.

Another embodiment is directed to a system for indirectly pairing a trusted device with an untrusted device. The system comprising an untrusted device associated with an untrusted device controller. The untrusted device configured to request a pairing identifier from the untrusted device controller and display the pairing identifier to the consumer. The untrusted device controller associated with the untrusted device. The untrusted device controller configured to receive a pairing identifier request from the untrusted device, identify an available pairing identifier, send the pairing identifier to the untrusted device, and receiving a pairing request from a trusted intermediary computer, identify the untrusted device associated with the pairing identifier, associate the pairing identifier with the trusted intermediary computer, and lock the received pairing identifier from additional pairing requests. The system further comprises a trusted device operated by a consumer. The trusted device configured to send the pairing identifier to the trusted intermediary computer. The system further comprises a trusted intermediary computer associated with the trusted device. The trusted intermediary computer configured to receive the pairing identifier from the trusted device, determine the untrusted device controller and send a pairing request to the untrusted device controller to indirectly pair the untrusted device with the trusted device. The trusted device is indirectly paired to the untrusted device through the trusted intermediary computer and the trusted device completes a transaction at the untrusted device without communicating transaction information to the untrusted device.

These and other embodiments of the invention are described in detail below.

DETAILED DESCRIPTION

Figure 1:
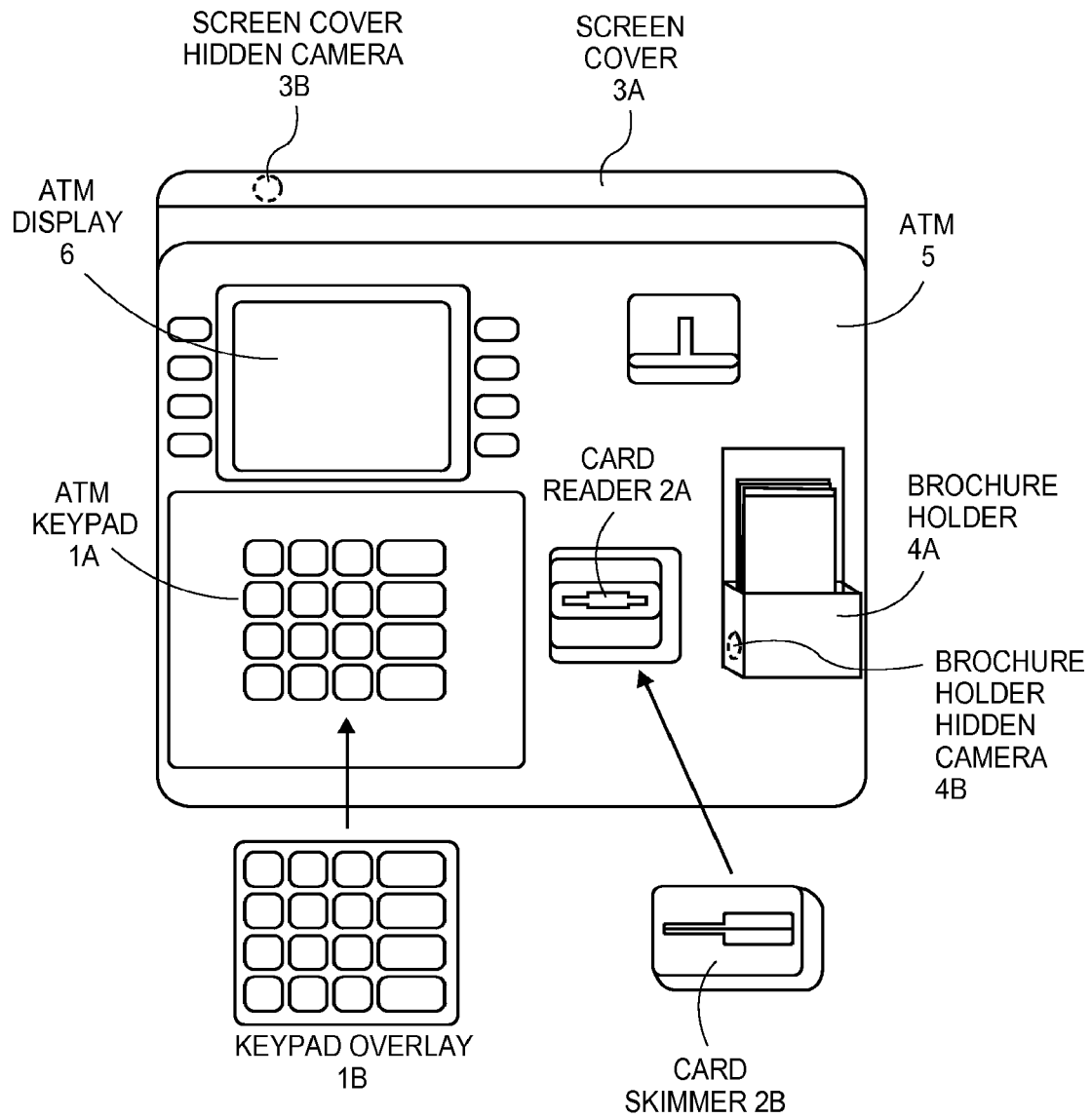
FIG. 1 illustrates an exemplary untrusted device and illustrates exemplary methods that a malicious third party may use to gain secure information of users of such untrusted devices.

Embodiments disclosed herein are directed to methods, systems, and apparatuses for indirectly pairing a trusted device with an untrusted device through the use of a trusted intermediary (also referred to as a "pairing broker"). In embodiments of the invention, the trusted intermediary indirectly pairs a trusted device with an untrusted device using a controller of the untrusted device that is trusted by both the trusted device and the untrusted device. Accordingly, embodiments allow users to complete transactions without providing sensitive information to an untrusted device.

According to some embodiments of the present invention, a user operating a trusted device may receive a pairing identifier from an untrusted device. The user may forward the pairing identifier along with other device identifier information to a trusted intermediary. The trusted intermediary may contact a controller for the untrusted device or device driver associated with the untrusted device (also referred to as an "untrusted device controller"). The untrusted device controller may use the pairing identifier to indirectly pair the user's trusted device with the untrusted device. Once indirectly paired, the user can send any number of transaction requests through the trusted intermediary to the untrusted device controller in order to accomplish any number of tasks (e.g., ATM withdrawal, vending machine purchase transaction, money transfer to a third party, provide secure access to a restricted area, provide access to secure information, etc.).

For example, in some embodiments, a consumer may use their mobile communication device (e.g., a mobile phone, smart phone, tablet, etc.) to pair with an untrusted automatic teller machine ("ATM") by requesting a pairing identifier from the ATM. The ATM may request a pairing identifier from an ATM device controller/driver that controls the ATM and makes transaction decisions on behalf of the ATM device. The ATM device controller may identify an available pairing identifier and may send a response with the pairing identifier to the untrusted ATM device. The ATM device may then display the pairing identifier for use by the consumer. The ATM device controller may also send the pairing identifier and an expiration time to a trusted intermediary computer which stores the pairing identifier along with a reference to the ATM device controller.

The user may then activate a connection with the trusted intermediary through their mobile communication device (trusted device) and authenticate themselves to the trusted intermediary. The user may then enter the displayed pairing identifier, and optionally some ATM identification information, into their mobile communication device (trusted device) which may generate a pairing request that is sent to the trusted intermediary. The trusted intermediary may then determine the relevant ATM device controller based on the ATM identification information and/or the pairing identifier, and may send a pairing request to the corresponding ATM controller.

The ATM controller may determine whether the pairing identifier is valid and if valid, the ATM controller may pair the untrusted ATM device with the trusted intermediary and lock the pairing identifier from future use. The ATM controller may then send a confirmation message to the ATM device that may be displayed on the ATM screen to notify the consumer that the ATM has been paired. Additionally, the consumer's mobile communication device (trusted device) may receive a confirmation message from the trusted intermediary informing the user that their trusted device is successfully paired with the ATM. Accordingly, the consumer may know that the ATM (untrusted device) is indirectly paired with their mobile communication device (trusted device) through the trusted intermediary. The consumer may now complete any number of transaction requests (e.g., withdrawal, deposit, account status check, etc.) by inputting commands through the mobile communication device. The transaction requests may be sent through the trusted intermediary to the ATM controller. The ATM controller may process the transaction request and may command or otherwise provide authorization to the indirectly paired ATM device to complete the transaction or display a transaction declined message to the user. Accordingly, an ATM transaction may be completed without the consumer providing any sensitive information through the physical inputs on the untrusted ATM device. Thus, sensitive transactions can be completed without the consumer's sensitive information being susceptible to theft or fraud by malicious third parties.

In another example, in some embodiments, the indirect pairing system may be used to provide payments and money transfers to an untrusted third party from a remote location, while the user is not present at the untrusted device. In this instance, the device used to access the money (e.g., an ATM) may or may not be trusted, but the person who wishes to gain access to the device may be untrusted, or both may be untrusted. However, by using the trusted intermediary, the consumer may complete the transaction from a remote distance without providing their sensitive information or account credentials to the untrusted third person or the untrusted device. For instance, instead of providing an ATM card and PIN to a third party, a user could ask the third party to go to an ATM, request a pairing identifier, and send the pairing identifier associated with the ATM to the user. The user could then indirectly pair with the ATM through the trusted intermediary and complete an ATM transaction through the trusted device while remote from the ATM.

In another example, in some embodiments of the present invention, the indirect pairing may be used to allow a consumer to log into a secure website from a public computer, or otherwise access secure areas, without requiring the user to input sensitive information into a public device (e.g., a computer in a cybercafé). Accordingly, the consumer may use the trusted intermediary to indirectly pair their trusted device to an online host, server computer, database, or other device that requires secure credentials to gain access to some sensitive information. The trusted intermediary may then provide user credentials (e.g., username, password, etc.) to the secure online host computer and the secure online host computer may authenticate the user and provide access to the secure information if the credentials are authenticated. Similar systems may be used to access secure physical areas without providing credentials directly to untrusted security devices (e.g., secure access keypads, electronic door locks, etc.).

Accordingly, embodiments of the present invention allow a trusted device to indirectly pair with an untrusted device through the use of a trusted intermediary in order to complete any task with an untrusted device or untrusted person that may involve the passing of sensitive information.

Embodiments of the present invention provide a number of technical advantages. For example, embodiments of the present invention provide more secure transaction systems from theft of sensitive information. For instances, embodiments allow a consumer to avoid providing sensitive information to a potentially infected device while completing a transaction. Additionally, embodiments of the present invention allow a consumer to transfer value or engage in a transaction while not being present at a transaction device, but may still maintain control over their sensitive information. Accordingly, while using embodiments of the present invention, a user's private information and sensitive credentials (e.g., PIN, PAN, Expiration Date, Track 2 data, username, password, etc.) are not physically exposed to a point-of-sale (POS) device or other untrusted device (e.g., public computer). Accordingly, if the untrusted device has been externally or internally compromised, the consumer's data remains secure.

Additionally, in some embodiments, a merchant or vender does not have to be given actual account information or other sensitive information so that the data is protected from malicious merchants or merchant employees. The untrusted device controller may command the untrusted device or merchant to complete the transaction without providing the user's sensitive information to the untrusted device. Accordingly, the untrusted device never obtains any sensitive information during a transaction. Instead, a device controller can process a transaction, maintain all of the sensitive information, and merely pass commands to the untrusted device or merchant. The commands or transaction decisions may include, for example, dispensing money, providing a product, allowing access, or otherwise completing the transaction without requiring the sharing of the consumer's sensitive information.

Additionally, embodiments of the present invention provide the technical benefits of allowing a consumer or user to interact with an untrusted device or service provider via a trusted or known device (e.g., a mobile phone, laptop, tablet, etc.) from any location and does not need to be in the presence of the untrusted device. Accordingly, embodiments allow users to remotely interact with devices (untrusted or otherwise). This is advantageous because a user can interact with an untrusted device and complete a transaction from any location and may send money or otherwise complete a transaction without providing their sensitive credentials to a third party. Accordingly, the user may complete a transaction with a third party while maintaining control of their private or sensitive information.

Finally, embodiments of the present invention transform any participating ATM into a world wide money transfer mechanism that allows a user to remotely transfer funds to any ATM for which they have a corresponding pairing identifier and/or device identifier. Additionally, a user may gain access to funds without requiring them to carry an ATM card or other wallet. As long as a user has access to a trusted device (mobile phone, tablet, laptop, etc.) they can access an ATM device controller and deliver funds to an identified ATM, without requiring the use of their ATM card or other physical credentials. Additional advantages and benefits of embodiments of the present invention may be determined from the description of the system and methods below.

Prior to discussing the example embodiments of the invention, a further description of some terms can be provided for a better understanding of the invention.

A "trusted device" may include any communication device that a user is associated with (e.g., owns, operates, or otherwise has access to on a regular basis). For example, the trusted device may include a mobile communication device (e.g., a mobile phone, smartphone, tablet, laptop, pager, etc.), a personal computer (e.g., a home computer), or any other device that a consumer may use to communicate with another device or computer. In some embodiments, the trusted device may be registered with a trusted intermediary through an identifier (e.g., a phone number, internet protocol (IP) address, device serial number, etc.) associated with the trusted device. Additionally, in some embodiments, the trusted device may not be registered with a trusted intermediary and instead, the user may be registered with a trusted intermediary. Further, the trusted device may be independent of an untrusted device and may not be directly connected with the untrusted device at any time during a transaction. In some embodiments, the trusted device may have a software application or other code installed thereon that is associated with a trusted intermediary and allows for a secure connection between the trusted device and the trusted intermediary.

An "untrusted device" may include any device that is unknown, not regularly monitored by a user, or otherwise may be tampered with without the user's knowledge. Furthermore, the untrusted device may include a device where a transaction or action may be initiated or completed. For example, an untrusted device may include an ATM device, a point-of-sale (POS) device, a public computer (e.g., a computer at a cybercafe), a security device (e.g., a secure entry point), or any other device that may perform a transaction or requested action that may request secure information from a user to complete the requested action or transaction. The untrusted device may be controlled by an untrusted device controller, server computer, authentication device, or other backend system that makes decisions regarding requested transactions or actions at the untrusted device.

An "untrusted device controller" or "device controller of an untrusted device" may include any computer, device, or system that makes decisions or controls the actions of an untrusted device. For example, the untrusted device controller may include a device backend or authorization system that receives a transaction request from an untrusted device, processes the transaction request, and provides a decision regarding the transaction request. Further, the untrusted device controller may include a web host server computer that determines if a user may gain access to secure information stored at the server computer or another server computer. Additionally, the untrusted device controller may be a security computer that receives requests for access from a secure access entry device to secure areas, authenticates the credentials of users, and makes decisions for the secure access entry device. The untrusted device controller may be configured to communicate with multiple untrusted devices and may include a central decision maker system that provides transaction decisions for multiple untrusted devices. Further, the untrusted device controller may be trusted by both the trusted device as well as the untrusted device.

A "trusted intermediary" may include any computer or system that is configured to communicate with trusted devices and untrusted device controllers. For example, the trusted intermediary may include one or more computers configured to communicate with a variety of trusted devices, untrusted device controllers, and any components between the trusted device and untrusted device controller. The trusted intermediary may be configured to communicate through any communication networks (e.g., wired or wireless networks), mobile network providers, open networks, or proprietary networks. The trusted intermediary may be configured to authenticate a user and/or trusted device by comparing received authentication information to a database of information received during registration. The trusted intermediary may be integrated into existing components within a transaction processing eco-system (e.g., a payment processing network) or may be an independent entity in the transaction eco-system.

A "pairing identifier" may include any information that may be used to identify a relationship between two or more devices, systems, or components. For example, the pairing identifier may include a series of alphanumeric characters, one or more graphics, a bar code, a QR code, or any other information that may be associated with an untrusted device controller. The pairing identifier may generated randomly or according to a predetermined algorithm, code, or shared secret. The contents of the pairing identifier may identify a generator of the predetermined algorithm or may be independent of the generation system. For example, the pairing identifier may include one or more digits, symbols, or characters that identify an untrusted device controller (e.g., every pairing identifier generated by a particular controller may begin with the controller identifier). Alternatively, the pairing identifier may be generated randomly and include a random collection of characters, digits, or numbers that temporarily identifiers a relationship with an untrusted device controller or trusted device (e.g., "AB12", "C7Z_365," etc.).

The pairing identifier may be generated by any entity within the indirect pairing system and may be stored at a trusted intermediary along with relationship or identification information for an untrusted device and/or a trusted device. Further, the pairing identifier may be passed between any number of devices and in any suitable manner. For example, the pairing identifier may be passed by itself or may be passed as part of a message, notification, request, response, or any other series of information. The pairing identifier may be used with any communication protocol. Further, the pairing identifier may include distinct information, a flag, or any other information such that it may be identified as a pairing identifier by a trusted device, trusted intermediary, untrusted device controller, untrusted device, or any other entity within the indirect pairing transaction processing system. Additionally, the pairing identifier may be incorporated into a communications protocol such that it may be placed in an appropriate section of a message to be identified, extracted, and used during a pairing request, response, transaction, or otherwise.

A "pairing identifier request" may include any message or information that informs an untrusted device controller to determine, generate, or identify a pairing identifier and send the pairing identifier to an untrusted device. The pairing identifier request may include any suitable information for determining an untrusted device associated with the request (e.g., an untrusted device identifier or address) and that the untrusted device is requesting a pairing identifier. Further, the pairing identifier request may request a specific expiration time or other configuration details that informs the untrusted device controller about the circumstances or information associated with the pairing identifier or transaction request (e.g., expire in 10 minutes, limit to a payment transaction, ATM transaction, etc.). The pairing identifier request may be sent by an untrusted device in response to a secure access or pairing access command from a user, system, component, or other entity involved in a transaction. For example, an ATM may generate and send a pairing identifier request in response to a user input for a "secure access" mode of operating an untrusted device.

A "pairing identifier response" may include any message or information that is sent in response to a pairing identifier request. For example, the pairing identifier response may include a valid and available pairing identifier for use in a pairing transaction. Any other information may be included in the pairing identifier response including an expiration condition or any other relevant information to the untrusted device, user, or trusted device.

A "pairing identifier notification" may include any message or information that is sent to inform a device or system that a pairing identifier has been generated, issued, or provided to an untrusted device. For example, a pairing identifier notification may be sent to a trusted intermediary (or multiple trusted intermediaries) to notify the trusted intermediary that a pairing identifier has been issued and that the pairing identifier is associated with a particular untrusted device controller. The pairing identifier notification may include any suitable information that may be relevant to identifying an untrusted device controller associated with a pairing identifier. For example, the pairing identifier notification may include the pairing identifier and an untrusted device controller identifier. The pairing identifier notification message may further include any other information that may be useful in a pairing transaction including an identifier for an untrusted device associated with the pairing identifier notification, a time, date, expiration condition, or any other relevant information. The trusted intermediary may store the pairing identifier provided in the pairing identifier notification so that the trusted intermediary may identify the untrusted device controller associated with a pairing identifier when they receive a pairing request using the pairing identifier.

A "pairing request" may include any message or information that allows a trusted intermediary or untrusted device controller to associate a pairing identifier with a trusted device, the trusted intermediary, an account, a user, or any other information that may identify a user, transaction, or device. The pairing request may include any suitable amount of information depending on the configuration of the indirect pairing system. For example, in some embodiments, a pairing request may include a message with a pairing identifier and information to identify a trusted device or user account. Alternatively, the pairing request may include a message with a pairing identifier, a trusted device identifier, user information (consumer name, address, location, etc.), trusted device information, account information (account identifier, expiration date, card verification value (CVV), PIN, username, password, etc.), account substitute (e.g., a token), transaction information (e.g., transaction amount, product, quantity, merchant, etc.), untrusted device identifier (e.g., serial number or IP address of a POS, ATM, computer, etc.), untrusted device controller information (e.g., an issuer identifier, card processing network identifier, untrusted device manager identifier, etc.), or any other information that may be relevant to a trusted intermediary or untrusted device controller in determining the untrusted device, untrusted device controller, and/or any other devices involved in a transaction or indirect pairing of devices in a transaction.

In response to receiving a pairing request, an untrusted device controller may perform any number of processes to indirectly pair the trusted device or trusted intermediary with an untrusted device. For example, the untrusted device controller may identify an untrusted device associated with the pairing request, associate a pairing identifier with a trusted intermediary or trusted device, and lock the pairing identifier from additional pairing requests.

In embodiments of the present invention, "associating a pairing identifier" with a trusted intermediary and/or trusted device may include any action by an untrusted device controller to pair, tie, or establish a relationship between an untrusted device associated with a pairing identifier and a trusted intermediary and/or a trusted device. For example, the untrusted device controller may update a pairing identifier database with a trusted intermediary identifier, a trusted device identifier, a user identifier, a user account identifier, or any other suitable information to tie a trusted intermediary or trusted device with a pairing identifier or untrusted device. Thereafter, whenever a transaction request or other information is received from the trusted intermediary with the particular pairing identifier, trusted device identifier, account identifier, or any other information that is associated with the pairing identifier, the untrusted device controller may know that the request should be acted on. Accordingly, if the untrusted device controller receives a pairing identifier from a different trusted intermediary or associated with a different trusted device than the associated trusted intermediary or trusted device, the untrusted device controller may decline or otherwise not perform the requested transaction or action. This process may be performed in any other suitable manner. For example, a substitute identifier may be provided to the trusted intermediary once the pairing identifier is associated with the trusted intermediary or trusted device such that the replacement identifier may be used to inform the untrusted device controller that the correct party is requesting the action. Any other suitable actions may be performed to associate the pairing identifier and the trusted intermediary or trusted device.

Once the pairing identifier is associated with a particular trusted intermediary and/or trusted device, the trusted device and the untrusted device may be considered to be "indirectly paired" because the trusted device and the untrusted device are associated at the untrusted device controller. Accordingly, transactions may be processed or other information may be passed between the trusted device and the untrusted device without either device directly communicating with each other. Instead, the information may be passed from the trusted device to the trusted intermediary, the untrusted device controller, and the untrusted device (and vice versa). "Indirect pairing" may include any communication or connection between a trusted device and an untrusted device where information passed between the trusted device and the untrusted device is achieved through communicating with at least one third party. Accordingly, the trusted device and the untrusted device do not communicate information to one another through any data input or output interfaces. Instead, the trusted device sends secure information to a trusted intermediary which transfers the information to an untrusted device controller. The untrusted device controller then processes the transaction request and commands the untrusted device to complete the transaction based on a transaction decision.

In embodiments of the present invention, "locking a pairing identifier" may include any action performed by a device such that the pairing identifier is no longer available for pairing devices. For example, an untrusted device controller may lock a pairing identifier once a pairing identifier is associated with a trusted intermediary and/or a trusted device. The locking may occur through any suitable methods. For example, a pairing identifier may be locked when a trusted intermediary and/or trusted device is associated with a pairing identifier and an identifier for the trusted intermediary and/or trusted device is stored in a pairing identifier database. Further, other methods of locking may include a flag or any other indicator being included in a pairing identifier database that informs the system that the pairing identifier has already been paired or is unavailable.

An "expiration condition" may include any information or setting that may be associated with a pairing identifier transaction or that may be triggered by a transaction request. For example, an expiration condition may include a time limit, a status for the pairing identifier (e.g., a locked status), number of uses, or any other suitable information that may be relevant to an untrusted device controller to limit the use of a pairing identifier. An associated pairing identifier cannot be used by the untrusted device controller to complete a pairing request or a transaction request after the expiration condition is triggered. The expiration condition may be associated with the pairing identifier in any suitable method. For example, the expiration condition may be stored in the pairing identifier database at the untrusted device controller or may be sent to a trusted intermediary and stored with the pairing identifier. Accordingly, the expiration conditions may be analyzed to determine if a pairing identifier is expired or is still valid for pairing or a transaction request. Furthermore, the expiration condition may be checked during a pairing process or during a transaction request process. Thus, different expiration conditions may be associated with the different stages of an indirect pairing transaction (e.g., pairing request expiration conditions and transaction request expiration conditions). For example, a user may have 10 minutes to submit a valid pairing request and then an additional 10 minutes to request a transaction. Any other expiration conditions may be implemented.

A "pairing response" may include any message or information in response to a pairing request that allows a trusted intermediary, untrusted device, or trusted device to determine the status of the pairing request sent to a untrusted device controller. The pairing response may include any suitable communication protocol, any suitable amount of information, and may include any information that allows a device to determine the status of the pairing request. For example, the pairing response may include as little information as a pairing identifier, a flag, an indicator of success or failure, or any combination thereof. For instance, the pairing response may return a message that indicates the pairing request was successful or declined. Alternatively, the pairing response may include information about the particular untrusted device that was paired, an expiration condition related to the pairing or the pairing identifier, the pairing identifier associated with the pairing response, a pairing identifier substitute, account information, trusted device information, or any other information relevant to the pairing request.

A "pairing notification" may include any message or information that informs an untrusted device of the status of a pairing request. A pairing notification may include any suitable information. For example, a pairing notification may be as simple as a message stating "paired," "busy," or "transaction pending." Alternatively, identification information may also be provided including a device identifier, an account identifier, a trusted intermediary identifier, a consumer name, or any other suitable information. Information included in the pairing notification may be displayed by an untrusted device such that a user, accountholder, consumer, or third party may determine that an untrusted device is currently paired with a trusted device.

A "transaction request" may include any message or information including details for a transaction. A transaction request may include any suitable information for an indirect pairing system to initiate a transaction. For example, a transaction request may include transaction information (e.g., monetary value, product, quantity, etc.), consumer information (e.g., name, address), account information (e.g., account identifier or primary account number (PAN), expiration date, CVV, etc.), a pairing identifier, user credentials (e.g., username, password, one-time password (OTP), etc.), a type of transaction (e.g., withdrawal, deposit, purchase, vending purchase, authentication, secure access, etc.), trusted device information, and/or any other relevant information for completing a transaction with the untrusted device. Further, the content of the transaction request may change depending on the type of transaction, the type of untrusted device, configuration of the indirect pairing system, and any other suitable information. For instance, in some embodiments, a trusted intermediary may store consumer account information and may replace the consumer account information or credentials in the transaction request. Alternatively, in other embodiments, no consumer information may be stored at the trusted intermediary and all consumer account information may be passed in the transaction request and forwarded to the untrusted device controller.

A "transaction decision" may include any message or information that instructs an untrusted device to complete an action, transaction, or series of actions. For example, the transaction decision may be as simple as a command (e.g., "allow access," or "dispense $100") or may be as complex as a series of commands (e.g., dispense cash and ask consumer for confirmation."). The transaction decision may be tailored to the specific untrusted device that is being controlled and may include different information depending on the type of request transaction. Further, the transaction decision may be provided in any suitable communication protocol such that an untrusted device may understand the instructions and complete a transaction. For example, in some embodiments, the transaction decision may be an authorization response message that was received at the untrusted device controller. Any suitable messages may be used in other embodiments.

A "transaction response" may include any message or information that is provided in response to a transaction request. For example, the transaction response may provide an indication of the results of a transaction request (e.g., success, approved, declined, etc.), a time that the transaction was processed, and/or any other relevant information. The transaction response may further include information regarding why, when, where, and how the transaction was completed for transaction reporting and storage for audit records at the trusted intermediary.

In embodiments of the present invention, "processing a transaction request" may include any transaction processing process or method incorporating any type of payment processing system or authorization system. For example, an untrusted device controller may be configured to communicate with a payment processing network (e.g., VisaNet®, MasterCard®, etc.), a proprietary, closed, or internal authorization system associated with the untrusted device controller, or any other payment processing system. For instance, when an untrusted device controller receives a transaction request, the untrusted device controller may process the transaction by generating an authorization request message and sending the authorization request message to a payment processing network (e.g., VisaNet®). The payment processing network may complete an authorization, authentication, or any other suitable processes to determine whether to approve the transaction and may further integrate any other entity within a transaction processing ecosystem to receive an authorization to process the payment. The payment processing network may then return an authorization response message providing authorization to process or complete the transaction. The untrusted device controller may receive the authorization response message and may determine an appropriate transaction decision (e.g., authorized, declined, etc.) associated with the transaction request. An internal or closed payment processor may receive authorization from a merchant computer, the untrusted device controller, or any other entity associated with the untrusted device to authorize the transaction.

A payment processing network may include data processing subsystems, networks, and operations used to support and deliver authorization services, exception file services, and clearing and settlement services. For example, the payment processing network may comprise a server computer, coupled to a network interface and a database(s) of information. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

Although many of the data processing functions and features of some embodiments may be present in the payment processing network (and a server computer therein), it should be understood that such functions and features could be present in other components such as the issuer computer, and need not be present in the payment processing network, or a server computer therein.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, untrusted device controller identifier, untrusted device location, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the untrusted device controller.

An "untrusted third party" may include any party, entity, person, or organization that is a beneficiary or agent of a beneficiary to a transaction that is not an account holder or user for the transaction. For example, an untrusted third party may include a recipient of a money transfer that is not an account holder of the initiating account for the money transfer. Further, the untrusted third party may be a family member, spouse, friend, acquaintance, or other third party that the account holder may otherwise trust. However, in order to minimize the chance of a possible misuse of an account, the account holder may perform a transaction with the untrusted third party without providing account credentials to the beneficiary.

Embodiments of the invention may include different types of indirect pairing systems. A first type of indirect pairing process includes indirectly pairing a trusted device with an untrusted device through an untrusted device controller associated with the untrusted device. The untrusted device controllers make decisions for the untrusted device and instruct the untrusted device controller as to what actions to take for a particular transaction. For example, typical unobserved or open public transaction devices (e.g., ATMs, gas pumps, etc.) are controlled by a backend control system or driver (e.g., an ATM authorization server computer, merchant computer, etc.). In such systems, a transaction is only authorized and actions may be taken by the untrusted device when an untrusted device controller authorizes a transaction or otherwise commands the public untrusted device to perform the action.

The second type of indirect pairing includes indirectly pairing a trusted device with a system comprising secure information that does not directly control or make decisions on behalf of the untrusted device. For example, an online website host server computer does not directly control the public computer that is being used to access or request information from the online website server computer. Instead, the host server computer controls access to secure information and may decide whether to release the information to the untrusted computer or not. Although the two embodiments operate in similar manners, both embodiments may be addressed separately below.

However, one of ordinary skill would recognize how the systems may be implemented in similar manners based on the description below. Accordingly, in the interest of brevity, similar steps between the two embodiments may not be described in detail each time they may occur and instead, the description may focus on differences between the two embodiments.

Figure 2:
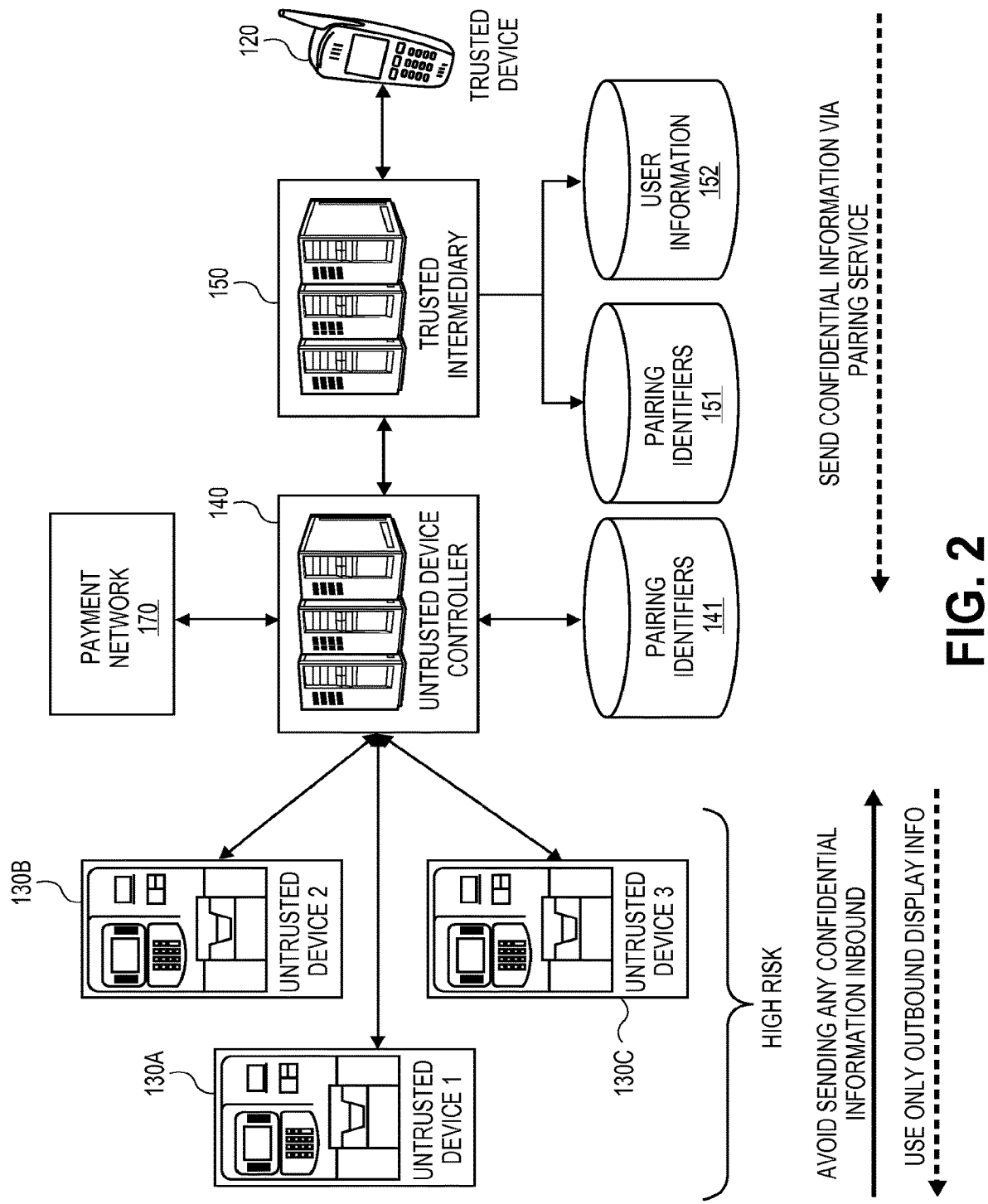
FIG. 2 illustrates an exemplary block diagram of a system for indirectly pairing a trusted device with an untrusted device through a trusted intermediary and untrusted device controller, according to an exemplary embodiment of the present invention.

I. Exemplary Systems for Indirectly Pairing with Untrusted Device Controllers FIG. 2 illustrates an exemplary block diagram of a system for indirectly pairing a trusted device 120 with an untrusted device 130 through a trusted intermediary 150 and untrusted device controller 140, according to an exemplary embodiment of the present invention. Embodiments of the present invention could be used with any suitable untrusted device controller 140 and a corresponding untrusted device 130. For example, ATMs, vending machines, gas pumps, automatic DVD dispensers, etc., or any other device that a user interacts with without a trusted person or attendant present.

As explained above, devices located in the public (i.e., untrusted devices) may typically be driven by a computer in a remote data center (e.g., an ATM driver computer system located at a bank) or other location, where the remote computer may make all of the decisions for the public device. For instance, in the context of an ATM transaction, a number of ATM devices may be connected and controlled by a single ATM driver that is located at a central bank or ATM network manager location. The untrusted ATM device may communicate consumer information to the ATM driver which actually initiates the transaction with an acquirer system (not shown but may be part of the payment network 170), payment processing network (not shown but may be part of the payment network 170), and issuer system (not shown but may be part of the payment network 170) that is associated with the consumer's financial information. Accordingly, the ATM driver may receive authorization to complete the transaction and may instruct the ATM to dispense the money. Therefore, the untrusted ATM itself does not make any decisions regarding whether to authorize the transaction and is merely accepting consumer information and generating requests to be sent to a central decision maker (i.e., ATM driver). Similarly, vending machines may also work in a similar manner where a central datacenter is generating payment authorization messages, receiving authorization responses, completing other fraud monitoring or other risk analysis and ultimately making a decision as to whether the transaction should be approved or denied. Many other devices are similarly controlled from a central authority or datacenter controller.

The indirect pairing system shown in FIG. 2 includes a number of different untrusted devices 130A-130C (e.g., ATMs 130A-130C), an untrusted device controller 140 (e.g., an ATM driver or ATM backend driver), a payment network 170, a trusted device 120 (e.g., a consumer's mobile communication device), and a trusted intermediary 150. A user (also referred to as a consumer or account holder) may be operating the trusted device 120 which may be present at the untrusted device 130 or may be remote to the untrusted device 130. Although the untrusted devices and trusted device 120 appear at separate ends of the system, in some embodiments, a user is present at an untrusted device 130 when operating the trusted device 120. However, in other embodiments, the user and the trusted device 120 may be operated remotely from the untrusted device 130. In such embodiments, an untrusted third party 170 may be present at an untrusted device 130 instead of a user. Methods for performing transactions where the trusted device 120 is remote from the untrusted device 130 are described in further detail in reference to FIG. 7 below.

An untrusted device 130 may include any automated device that a consumer may interact with to complete a transaction. For example, as described above, the untrusted device 130 may be a gas pump, ATM (as shown in FIG. 2), public computer (e.g., a computer at a cybercafé), a security keypad, etc. The untrusted device 130 may be communicatively coupled to an untrusted device controller 140 that provides transaction authorization, decision making, and other functionality for the untrusted device 130.

The untrusted device 130 may perform some functionality without control inputs from the untrusted device controller 140 but may send any received information from a consumer, user, or other third party to an untrusted device controller 140 for authorization to complete a transaction, for interfacing with other systems (e.g., fraud analysis systems, payment processing networks, etc.), and/or for updates to the software of the untrusted device 130. As explained previously, the untrusted devices may include a computer that has software installed in order to automatically complete the requested transactions. However, malicious third parties may be capable of corrupting the software or hardware of the untrusted device 130 and may be able to obtain the sensitive information of a consumer during a transaction.

An untrusted device controller 140 may include any entity, system, or device that controls an untrusted device 130. For example, as explained above, the untrusted device controller 140 may be a computer located at a datacenter that receives transaction requests from the untrusted device controller 140, processes the transaction request, and provides authorization (e.g., approve or decline) for a transaction request. The untrusted device controller 140 may provide a command to the untrusted device 130 along with the transaction response that may inform the untrusted device 130 of one or more actions that the untrusted device 130 then performs (e.g., transaction request approved—dispense $100). Furthermore, although the untrusted device controller 140 is shown as being located at a central location in FIG. 2, the untrusted device controller 140 may also be located at or integrated into an untrusted device 130 if the untrusted device computer makes the decisions for the untrusted device 130 and is configured to communicate with a trusted intermediary 150.

An untrusted device controller 140 may include a computer configured to receive a pairing identifier request from an untrusted device 130, determine an available pairing identifier, associate the available pairing identifier with an untrusted device 130, and send a pairing identifier response including the pairing identifier to the untrusted device 130 to be displayed to a consumer. The computer may further be configured to receive a pairing request including the pairing identifier from a trusted intermediary 150, identify the untrusted device 130 associated with the pairing request, associate the pairing identifier with the trusted intermediary 150, and lock the pairing identifier from additional pairing requests. Accordingly, the trusted device 120 and the untrusted device 130 may be indirectly paired or associated through the untrusted device controller 140 computer. The computer may be configured to receive a transaction request from the trusted intermediary 150, process the transaction, and submit a command or transaction decision to the untrusted device 130 to complete the transaction request. The untrusted device controller computer 140 may include any number of software modules in order to complete the functionality described herein.

The untrusted device controller 140 may include or be coupled with a pairing identifiers database 141. The pairing identifiers database 141 may comprise generated pairing identifiers, untrusted device information, consumer information, trusted intermediary information, or any other relevant information to issuing, associating, and processing transactions between untrusted devices and trusted intermediaries. For example, the pairing identifiers database 141 may comprise both available and unavailable pairing identifiers. The available pairing identifiers may not be associated with any other devices. Further, the untrusted device controller 140 may generate new pairing identifiers and compare the generated pairing identifiers to the stored pairing identifiers in the pairing identifiers database 141 to ensure that the newly generated pairing identifier is unique. The associated or unavailable pairing identifiers may have further information stored in the pairing identifiers database record. For example, the pairing identifiers database 141 may comprise a pairing identifier, an associated trusted intermediary 150, an associated trusted device 120, account information provided by the associated trusted intermediary 150 or trusted device 120, and an expiration condition. The untrusted device controller 140 may validate the status of the pairing identifier by searching the pairing identifiers database 141 for the matching pairing identifiers database record whenever the untrusted device controller 140 receives a request from a trusted intermediary 150. If the pairing identifier is associated with a different trusted intermediary 150, trusted device 120, an expiration condition has been triggered for the pairing identifier, the untrusted device controller 140 may decline the transaction request.

A trusted device 120 may include any device that a consumer trusts and is capable of communicating with a trusted intermediary 150. For example, a trusted device 120 may be a mobile communication device (e.g., cellular phone, smartphone, tablet device, etc.). The trusted device 120 may include a processor and a computer readable medium coupled to the processor comprising code, executable by the processor for implementing the functionality described herein. Further details regarding exemplary trusted devices is provided in reference to FIG. 11 below.

Further, in some embodiments, the computer readable medium may comprise code associated with a trusted intermediary application that may allow the trusted device 120 to quickly and easily provide the appropriate information for pairing, authenticating, and submitting a transaction request. For example, a user may be able to select a type of transaction (e.g., an ATM transaction, a vending transaction, a merchant transaction, etc.), a type of untrusted device 130 (e.g., ATM, gas dispenser, vending machine, etc.), or a name of a provider (e.g., Bank 1, Merchant A, Vending company X, etc.) in order to obtain preconfigured request templates associated with a particular untrusted device 130. For instance, a user may open the trusted intermediary application on the mobile communication device and select that they would like to complete an ATM transaction. The trusted intermediary application may display an ATM transaction template asking for a pairing identifier, a type of transaction (e.g., withdrawal, balance check, deposit, etc.), an account (e.g., checking, savings, credit, etc.), etc. Accordingly, the user may know the specific information that may be necessary to complete a transaction. Further, the information may change for the type of transaction, provider, etc. Additionally, these requests may come in multiple steps, for example, the pairing information may be submitted first and then, once indirectly paired, the trusted intermediary application may request untrusted device 130 specific information.

Further, the template information may be determined and submitted by the trusted intermediary 150 after receiving a pairing response from the untrusted device controller 140 or once the untrusted device controller 140 has been determined.

In some embodiments, the consumer may store their sensitive or financial information on the trusted device 120. However, in other embodiments, the consumer may merely use the trusted device 120 to send commands to the trusted intermediary 150, and the trusted intermediary 150 may store the consumer's sensitive or financial information. In the latter case, the consumer may use the trusted device 120 to enroll with a trusted intermediary 150 or may use a different device to enroll. The consumer could also enroll through any other suitable method including without the use of a device (e.g., in-person with a customer service representative).

A trusted intermediary 150 (i.e., pairing broker) may include any entity that a consumer trusts with their personal or financial information and is configured to communicate with a untrusted device controller 140 and trusted device 120. For example, a trusted intermediary 150 may be operated by a payment processing network, an issuer system, an unrelated third party, or any other entity that a consumer trusts with their information. In one embodiment, the trusted intermediary 150 may comprise a server computer located at a payment processing network. A payment processing network already has a relationship with the untrusted device controllers related to transactions, so the payment processing network can use pre-existing payment processing links to complete these types of transactions as a trusted intermediary 150. However, any other entity that is connected to an untrusted device driver or has the ability to communicate with untrusted device controllers and consumer devices may implement a trusted intermediary 150. The trusted intermediary 150 may comprise a pairing identifiers database 151 and a user information database 152.

A trusted intermediary computer 150 may include a processor and a computer readable medium coupled to the processor comprising code, executable by the processor, for implementing a method of indirectly pairing a trusted device 120 with an untrusted device 130 through an untrusted device controller 140. The trusted intermediary computer 150 may comprise any number of software modules in order to complete the functionality described herein. For example, the computer 150 may include software modules for receiving a pairing request from the trusted device 120, extracting the pairing identifier from the pairing request, searching a pairing identifier database 151 for a matching pairing identifier, determining the untrusted device controller 140 associated with the matching pairing identifier in the pairing identifier database 151, and sending the pairing request to the untrusted device controller 140. Further, the computer 150 may include software modules for receiving a pairing response from the untrusted device controller 140 indicating that the untrusted device is paired with the computer 150 and sending a pairing confirmation to the trusted device 120. The trusted intermediary computer 150 may include any other software modules associated with the functionality of the trusted intermediary described herein.

The pairing identifiers database 151 may comprise any information associated with pairing identifiers received from a trusted device 120 or an untrusted device controller 140. For example, the trusted intermediary 150 may receive a pairing identifier from an untrusted device controller 140 whenever a user requests a secure access or pairing mode of transaction on an untrusted device 130. The secure access request may inform the untrusted device 130 that the user would like to complete the transaction using the indirect pairing processes and the untrusted device 130 may request for a pairing identifier from the untrusted device controller 140. The untrusted device controller 140 may determine an available pairing identifier and may provide the pairing identifier to the trusted intermediary 150. Where multiple trusted intermediaries exist in a pairing system, the untrusted device controller 140 may send the pairing identifier to all trusted intermediaries or to a designated trusted intermediary 150 that may be associated with the particular untrusted device 130, region where the untrusted device 130 is located, or through any other method of separating pairing requests from a larger subset of trusted intermediaries. For example, the user may input the specific trusted intermediary 150 that they may have a pre-existing account with or that they are configured to use. Further, the user may select one of a number of offered trusted intermediaries that are presented to the user as options by the untrusted device 130 and the untrusted device controller 140 may send the pairing identifier to the trusted intermediary 150 that is selected. Accordingly, the trusted intermediary 150 may receive a pairing identifier from the trusted device 120 during a transaction or pairing request and may store any other relevant data including the identity of the particular untrusted device controller 140 that sent the pairing identifier in the pairing identifiers database 151.

Further, the trusted intermediary 150 may also comprise a user information database 152. The trusted intermediary 150 may store information provided by the user during enrollment, transaction requests, authentication processes, or during any other interaction with the trusted intermediary 150 in the user information database 152. The user information database 152 may comprise personal information, account information, trusted device information, secure information (e.g., credentials, usernames, passwords, etc.), and any other relevant information in the user information database 152. Further, the user information may be separated according to a user identifier, device identifier, or any other suitable unique information that allows the trusted intermediary 150 to identify the user associated with a request, authentication, or transaction.

A consumer may enroll for pairing services with the trusted intermediary 150 or may send sensitive information to the trusted intermediary 150 without enrolling with the trusted intermediary 150, using the trusted intermediary 150 as a secure gateway for their sensitive information. Where the user or consumer does not enroll with the trusted intermediary 150, the trusted intermediary 150 may not store their data or may only store data temporarily for the duration of completing a particular transaction and then delete the information.

A payment network 170 may include any transaction system that allows the untrusted device controller 140 to process a transaction. For example, the payment network 170 may include an authorization system, a payment processing network, transaction processing system, or other system or entity that is configured for authorizing, processing, authenticating, and determining whether a transaction may be approved or authorized. Typical payment networks may include an acquirer, payment processing network, issuer, and any other services that may be involved in a transaction decision (e.g., a third party risk analysis system). The payment network 170 may include any one of these entities or any combination of these entities. An exemplary embodiment of an authorization system is provided in U.S. Pat. No. 7,809,650 to Bruesewitz et al. entitled "Method and System for Providing Risk Information in Connection with Transaction Processing," which is hereby incorporated by reference in its entirety. It should be understood that embodiments are not so limited. Any suitable authorization or transaction processing systems may be incorporated in embodiments of the present invention.

II. Exemplary Methods for Indirectly Pairing Trusted Devices with Untrusted Device Controllers FIG. 3 illustrates an exemplary flowchart for a method of indirectly pairing a trusted device 120 with an untrusted device 130 through a trusted intermediary computer 150 and untrusted device controller 140, according to an exemplary embodiment of the present invention.

The indirect pairing process provided by the trusted intermediary computer 150 allows a user or consumer to complete any number of different types of transactions using untrusted public devices without having to provide sensitive credential information (e.g., password, account data, PIN, etc.) to the untrusted public device. For example, a user may access a secure area, withdraw money from an ATM, buy an item from a vending machine, or perform any number of other secure tasks with public untrusted devices. For example, in embodiments shown in FIGS. 5 and 6, a consumer may withdraw money from an ATM or buy an item from a vending machine without providing any sensitive information to the ATM or vending machine itself. No card or account information is provided, no PIN is entered, and no other sensitive information is input into the ATM or vending machine.

Figure 3:
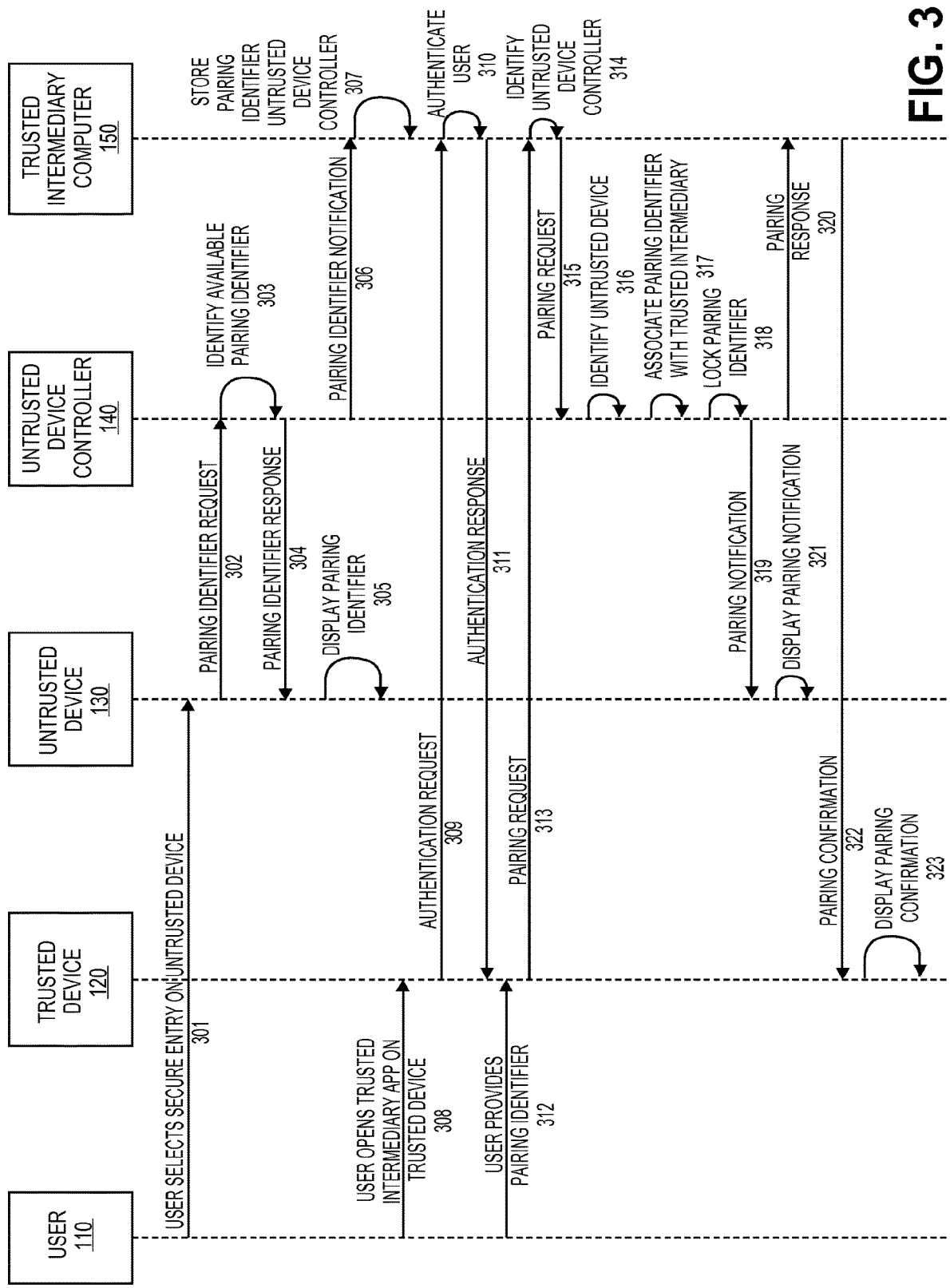
FIG. 3 illustrates an exemplary flowchart for a method of indirectly pairing a trusted device with an untrusted device through a trusted intermediary and untrusted device controller, according to an exemplary embodiment of the present invention.

In order to complete a transaction using the indirect pairing system, first a trusted device 120 may be indirectly paired with the untrusted device 130 through a trusted intermediary computer and an untrusted device controller 140 (shown in FIG. 3). Once indirectly paired, the trusted device 120 may complete a transaction with the untrusted device 130 by sending a transaction request through the trusted intermediary computer 150 to the untrusted device controller 140 (shown in FIG. 4).

A. Methods for Indirectly Pairing a Trusted and Untrusted Device

In step 301, the user approaches an untrusted device 130 and selects an option on the untrusted device 130 for "secure entry" or an "indirect pairing" transaction. The user does not identify themselves by swiping any physical card, inputting personal or secure information into the untrusted device 130, or providing any additional information. In some embodiments, it may be possible for the user to select a particular trusted intermediary computer 150 they wish to use for the secure access transaction or may be able to provide additional transaction expiration conditions (e.g., a time limit, number of transactions they wish to complete, etc.).

In step 302, the untrusted device 130 informs the untrusted device controller 140 that secure entry has been requested. The untrusted device 130 may generate and send a pairing identifier request to the untrusted device controller 140 to ask for an available pairing identifier from the untrusted device controller 140. The pairing identifier request may include an untrusted device identifier and any expiration conditions input by the user. Further, where a user selects a particular trusted intermediary computer 150 in which they wish to use for the indirect pairing transaction, the pairing identifier request may provide a trusted intermediary identifier for the selected trusted intermediary computer 150.

In step 303, the untrusted device controller 140 receives the pairing identifier request and generates a unique pairing identifier for the indirect pairing. Alternatively, the untrusted device controller 140 may identify an available pairing identifier in a pairing identifier database. The untrusted device controller 140 may control a large number of untrusted devices and thus, many different pairing identifiers may be generated and/or outstanding at any particular time. Accordingly, the untrusted device controller 140 may search a pairing identifiers database 141 for available pairing identifiers. Alternatively, the untrusted device controller 140 may generate a unique pairing identifier and may compare the generated pairing identifier to the pairing identifiers in the pairing identifiers database 141 to ensure the pairing identifier is unique.

The pairing identifier may be any identifier that is sufficiently unique that a sufficient number of unique pairing identifiers can be generated at any given time. For example, the pairing identifier may be an alpha-numeric combination (e.g., "12AB"), a graphic or QR code that may be displayed by an untrusted device 130 and captured by a trusted device 120, or any other suitable information that may be unique to the transaction and may be easily perceived and entered by a trusted device 120. The pairing identifier may be limited in size so that it is easy for a consumer to enter into their trusted device 120 and this may be possible because the pairing identifier may only be unique for a couple minutes. Accordingly, the same pairing identifier can be used over and over many times by an untrusted device controller 140, so long as the same pairing identifier is only active once at a time.

The pairing identifier may be unique within the provider's network (i.e., unique to the untrusted device controller 140) or in some embodiments, may be unique to the trusted intermediary computer 150. The pairing identifier may only be used once for a given device controller at any one time and as will be described in further detail below, may be locked once a pairing request including a pairing identifier is sent by a trusted intermediary computer 150. Finally, the pairing identifier is not generated using sensitive data, and is not sensitive itself, therefore there is no risk in the pairing identifier being intercepted by a malicious third party. Accordingly, the pairing identifier may merely be a random alpha-numeric combination (or other unique set of data) that may be used to identify an untrusted device 130 to a requesting trusted intermediary computer 150 and subsequently a corresponding consumer/user.

The untrusted device controller 140 may also generate or associate expiration conditions with an available pairing identifier. For example, a pairing identifier may be limited to a certain active time-limit, number of transaction requests, or any other expiration condition. If the pairing identifier is not requested to be paired with a trusted device 120 during this time-limit, the pairing identifier may have met an expiration condition and may be deleted or otherwise deactivated, such that a trusted device 120 may not indirectly pair with an untrusted device 130 using the pairing identifier.

In step 304, the untrusted device controller 140 sends a pairing identifier response including the pairing identifier to the untrusted device 130. The untrusted device 130 may receive the pairing identifier response and extract the received pairing identifier for display to the user.

In step 305, the untrusted device 130 displays the received pairing identifier to the user. Accordingly, the user may receive the pairing identifier and may use the pairing identifier to request an indirect pairing with the untrusted device 130 through a trusted intermediary computer 150. Note that if a third party is looking over the consumer's shoulder or is recording the transaction and enters the pairing identifier before the consumer has a chance to do so, the consumer has not entered any personal information and is under no threat of fraud or account theft. In fact, the malicious third party may connect with their own account through the trusted intermediary computer 150 and any completed transaction would be provided at the untrusted device 130 that the consumer is present at, and the malicious third party may be defrauded instead of the consumer.

In step 306, the untrusted device controller 140 generates and sends a pairing identifier notification message including the pairing identifier to the trusted intermediary computer. The trusted intermediary computer 150 may be selected by a consumer during the transaction or the trusted intermediary computer 150 may have a particular relationship with the untrusted device controller 140. For example, when the consumer chooses a secure entry option, the consumer may be provided with a number of options for trusted intermediaries that are configured to communicate with that untrusted device's controller. Alternatively, the consumer may be able to enter contact information for the trusted intermediary computer 150 that allows the device controller to communicate with the trusted intermediary computer 150 (e.g., a trusted intermediary server computer internet protocol (IP) address or other communication method to generate a new trusted intermediary relationship).

In step 307, the trusted intermediary computer receives the pairing identifier notification, extracts the pairing identifier from the pairing identifier notification, and stores the pairing identifier in a pairing identifier database. The pairing identifier notification message may further include any expiration conditions as well as an identifier for the untrusted device controller 140 and/or untrusted device 130. The trusted intermediary computer 150 may therefore, store any information associated with the pairing identifier in the pairing identifier database including any expiration conditions, untrusted device controller 140 identifier, and untrusted device identifier.

In step 308, the user is presented with the pairing identifier displayed on the ATM and may activate their trusted device 120 to begin contact with the trusted intermediary computer 150. This contact may occur in any suitable manner. For example, the trusted device 120 may be a consumer's mobile communication device with a trusted intermediary application installed on the mobile communication device such that the consumer can start the pairing process quickly and easily (e.g., by launching the application). Alternatively, the trusted intermediary computer 150 may be contacted through an internet website, phone call, or any other suitable manner that a trusted device 120 may contact the trusted intermediary computer 150.

In steps 309-311, the user authenticates themselves to the trusted intermediary computer 150. The authentication may occur through any suitable manner as one of ordinary skill in the art would recognize. For example, challenge response authentication, password based, CAPTCHA, or any other suitable authentication method may be implemented. However the authentication process occurs, one or a number of messages may be sent between the trusted device 120 (e.g., smartphone) and the trusted intermediary computer 150. In the example shown in FIG. 3, the trusted device 120 may initiate the authentication process by sending an authentication request to the trusted intermediary computer 150. The authentication request may include an identifier for the user operating the trusted device 120 (e.g., username, customer number, registration number, full name, etc.), a trusted device identifier (e.g., phone number, serial number, etc.), authentication credentials (e.g., a password, account authentication token, etc.), or any other information that may be relevant to an authentication process.

In step 310, the trusted intermediary computer 150 receives the authentication request message, identifies the user and/or trusted device 120, and authenticates the user and/or the trusted device 120. For example, the trusted intermediary computer 150 may receive a username, password, and phone number in the authentication request. The trusted intermediary computer 150 may determine the user information associated with the username and/or phone number and may determine if the password matches a predetermined password stored during enrollment. Further, the trusted intermediary computer 150 may complete any additional authentication steps including, for example, sending a one-time password (OTP) for validation, challenge question, or any other suitable process to further authenticate the user and/or the trusted device 120. Note that in some embodiments, the authentication steps may be bypassed entirely.

In step 311, the trusted intermediary computer sends an authentication response message including an indication of whether the user is authenticated. The trusted device 120 may receive the authentication response and inform the user that they have been authenticated through any suitable method (e.g., message display, audio playback, etc.). If the user is not authenticated, the user may be provided with another chance to authenticate themselves or the pairing process may be stopped. The user may then restart the pairing process by attempting another authentication request or may request a different type of authentication method (e.g., through an email account or other transaction channel that is associated with the user information stored at the trusted intermediary computer).

In step 312, assuming the user is authenticated, the user may provide the pairing identifier to the trusted device 120. In some embodiments, the user may also provide any additional information at this step. For example, the user may provide an untrusted device identifier (if there is one) as a second form of validation for ensuring the correct untrusted device 130 is being indirectly paired. In such embodiments, the trusted intermediary computer 150 may then compare the received untrusted device identifier to the pairing identifiers database entry associated with the pairing identifier to ensure a received untrusted device identifier received from the untrusted device controller 140 matches the received untrusted device identifier from the trusted device 120.

In step 313, the trusted device 120 may generate and send a pairing request including the pairing identifier to the trusted intermediary computer. The pairing request message may include any suitable information to allow the trusted intermediary computer 150 to identify the untrusted device controller 140 and pairing identifier associated with the pairing request. For example, the pairing request message may include the pairing identifier and an untrusted device identifier, the city, state, zip code, form factor of the trusted device 120 or untrusted device 130, etc., in order for the trusted intermediary computer 150 to identify the untrusted device controller 140 or the untrusted device 130 that the user is attempting to pair with. Although it is possible to determine the untrusted device 130 upon the pairing identifier alone, such a system may identify an incorrect untrusted device controller 140 if the pairing identifier is not unique across all possible untrusted devices and untrusted device controllers that the trusted intermediary computer 150 may possibly communicate with. Accordingly, the pairing request may include secondary information about the untrusted device 130 or the pairing request to help the pairing identifier or trusted intermediary computer 150 to determine the correct untrusted device controller 140.

In step 314, the trusted intermediary computer 150 determines the untrusted device controller 140 associated with the pairing request. The trusted intermediary computer 150 may receive the pairing request, extract the pairing identifier from the pairing request, and search a pairing identifiers database 151 for a matching pairing identifier. Further, in some embodiments, the trusted intermediary computer 150 may verify the pairing identifier is active, valid, and/or unlocked by searching a pairing identifiers database 151 for status information associated with the pairing identifier. In some embodiments (not shown in FIG. 3) the trusted intermediary computer 150 may send a verification request to the determined untrusted device controller 140 to determine if the pairing identifier is still active, has not been requested by the trusted intermediary computer 150 or a different trusted intermediary (not shown) previously, or has not met an expiration condition. If the pairing identifier is associated with a triggered expiration condition or is otherwise locked or unavailable, the pairing identifier cannot be used by the untrusted device controller 140 and the pairing request may be declined. Further, if the trusted intermediary computer 150 receives additional information in the pairing request that may limit or further ensure the correct untrusted device controller 140 is being identified, the trusted intermediary computer 150 may use the second information to further match the received pairing identifier to an untrusted device controller 140 stored in the pairing identifiers database 151. For example, if two entries are found for the pairing identifier "12AB," the trusted intermediary computer 150 may select the matching pairing identifier entry that is associated with an untrusted device controller 140 that services transactions originating from a received city and state in the pairing request. This process may continue until the trusted intermediary computer 150 determines the best possible match or the exact match for the pairing request.

In step 315, the trusted intermediary computer 150 sends the pairing request to the untrusted device controller 140. The pairing request may be the same as the previously received pairing request from the trusted device 120 or the trusted intermediary computer 150 may update information, provide new formatting, or provide additional information in the pairing request. For example, in some embodiments, the trusted intermediary computer 150 may exchange a username provided in the pairing request from the In step 316, the untrusted device controller 140 receives the pairing request, extracts the pairing identifier, and identifies the untrusted device 130 associated with the pairing identifier. Further, once the pairing identifier is extracted, the untrusted device controller 140 may search the pairing identifiers database 141 for a matching pairing identifier entry and determine if the pairing identifier is valid, available, and whether an expiration condition has been triggered. If the pairing identifier is available and valid, the pairing process may continue. However, if the pairing identifier is unavailable, invalid, and/or an expiration condition has been triggered the pairing process may be stopped and the trusted intermediary computer may be notified that the pairing identifier is expired, unavailable, or invalid. Additionally, if the pairing identifier cannot be found in the pairing identifiers database 141, the untrusted device controller 140 may inform the trusted intermediary computer 150 of the error. Any other information included in the pairing request (e.g., trusted device information, user information, trusted intermediary information, etc.) may also be used to determine if the pairing identifier is valid, available, and whether any expiration conditions have been triggered. For example, a trusted intermediary identifier or trusted device identifier may be used to ensure the pairing identifier was not already paired or associated with the requesting trusted intermediary computer and/or trusted device 120.

In step 317, if the pairing identifier is still active and has not been previously requested or met an expiration condition (e.g., a time limit since the pairing identifier was generated or was previously used by another pairing service), the untrusted device controller 140 may associate the pairing identifier with the trusted intermediary computer 150, the trusted device 120, and/or the user account, depending on the information provided in the pairing request.

The untrusted device controller 140 may associate the pairing identifier with the trusted intermediary computer 150, trusted device 120, and/or the user through any suitable method. For example, the untrusted device controller 140 may store a trusted intermediary identifier, a trusted device identifier, and/or user account identifier in the pairing identifiers database 141 along with the pairing identifier. Accordingly, the pairing identifier may only be used by the identified trusted intermediary computer 150, trusted device 120, or user account stored in the pairing identifiers database 141 with the received pairing identifier.

In step 318, the untrusted device controller 140 may lock the pairing identifier from future use. The untrusted device controller 140 may lock the pairing identifier through any suitable method. For example, the process of associating the pairing identifier with the trusted intermediary computer 150, trusted device 120, or user may be sufficient to constitute a locking of the pairing identifier because the untrusted device controller 140 may identify the trusted identifier as being locked once the pairing information is stored in the pairing identifiers database 141. Alternatively, the untrusted device controller 140 may store an additional locking flag or other information in the pairing identifiers database 141 along with the identified pairing identifier.

In step 319, the untrusted device controller 140 may generate and send a pairing notification to the identified untrusted device 130. The pairing notification may include any suitable indicator to inform the untrusted device 130 (and subsequently the user) that the untrusted device 130 has been locked and is now paired.

In step 320, the untrusted device controller 140 may generate and send a pairing response to the trusted intermediary computer 150 with a notice that the pairing identifier is valid and is now locked. The untrusted device controller 140 may then log the relationship between the trusted intermediary computer 150 and the untrusted device 130 and may associate any future commands or requests sent from the trusted intermediary computer 150 with that particular pairing identifier, to correspond to the untrusted device controller 140 and/or untrusted device 130. Accordingly, at this point, the trusted device 120 may be indirectly paired to the untrusted device 130 and the trusted device 120 is capable of requesting and completing a transaction with the untrusted device 130 without communicating transaction information or other secure information to the untrusted device 130.

Therefore, if another party tries to interfere with your transaction and punches in the pairing identifier into their trusted device 120, the untrusted device controller 140 may return a result of the pairing identifier being previously locked and may not allow the subsequent pairing request to pair with the untrusted device 130. Additionally, if a malicious third party pairs with the device before the user is able to, the pairing service may pair to the malicious third party's device, not the user's device, so it would be their malicious third party's account that gets charged, and the user would receive a failure message. As such, there is no risk for someone else to grab a pairing identifier because the pairing identifier does not comprise any sensitive information related to the consumer.

In step 321, the untrusted device 130 displays the received pairing notification to inform the user that the untrusted device 130 is now locked. The pairing notification displays the pairing notification so that the user may (1) confirm that the untrusted device 130 is paired with the trusted device 120 and (2) may not initiate another attempt to pair with the untrusted device 130. In this manner, the user receives feedback as to whether the correct untrusted device 130 has been paired with the trusted device 120.

In step 322, as a second form of verification to the user that the correct device has been paired, the trusted intermediary computer 150 may send a pairing confirmation to the trusted device 120. The pairing confirmation may include any indication that the trusted device 120 has been paired to the requested pairing identifier. The pairing confirmation may further include any additional information to assist the user in determining that they are indirectly paired with the correct untrusted device 130. For example, the pairing confirmation may include an address of the untrusted device 130, another randomly generated validation number (i.e., pairing confirmation number), or any other information that may be available to the untrusted device controller 140 or the trusted intermediary computer 150 regarding the untrusted device 130.

In step 323, the trusted device 120 may display the pairing confirmation for the user.

Accordingly, in some embodiments, the user may receive two separate verifications that (1) the untrusted device 130 has been paired as displayed on the untrusted device 130 and (2) the trusted device 120 has been paired displayed on the trusted device 120. In some embodiments, pairing identifiers that previously may or may not be provided, can be provided to further inform the consumer that they are paired with the correct device. For example, the trusted intermediary computer 150 may return some information about the ATM that the user did not previously provide to ensure the correct ATM has been paired (e.g., "you have successfully been paired to the ATM operated by ABC Corp. located on 1$^{st}$ and Elm"). Accordingly, the ATM could also display some personal information about the consumer to ensure the user that they are paired with the correct untrusted device 130.

Accordingly, the consumer is now indirectly paired with the untrusted device 130 without providing any sensitive information to the hardware or software of the untrusted device 130. As will be explained in further detail below in FIGS. 4-6, the consumer may now use their indirectly paired trusted device 120 to complete any number of transactions with the untrusted device 130 while maintaining the privacy and security of their personal information. For example, FIGS. 5-6 provide a couple exemplary use cases of what a consumer may do once their trusted device 120 is indirectly paired with an untrusted device 130 via a trusted intermediary computer 150.

Figure 4:
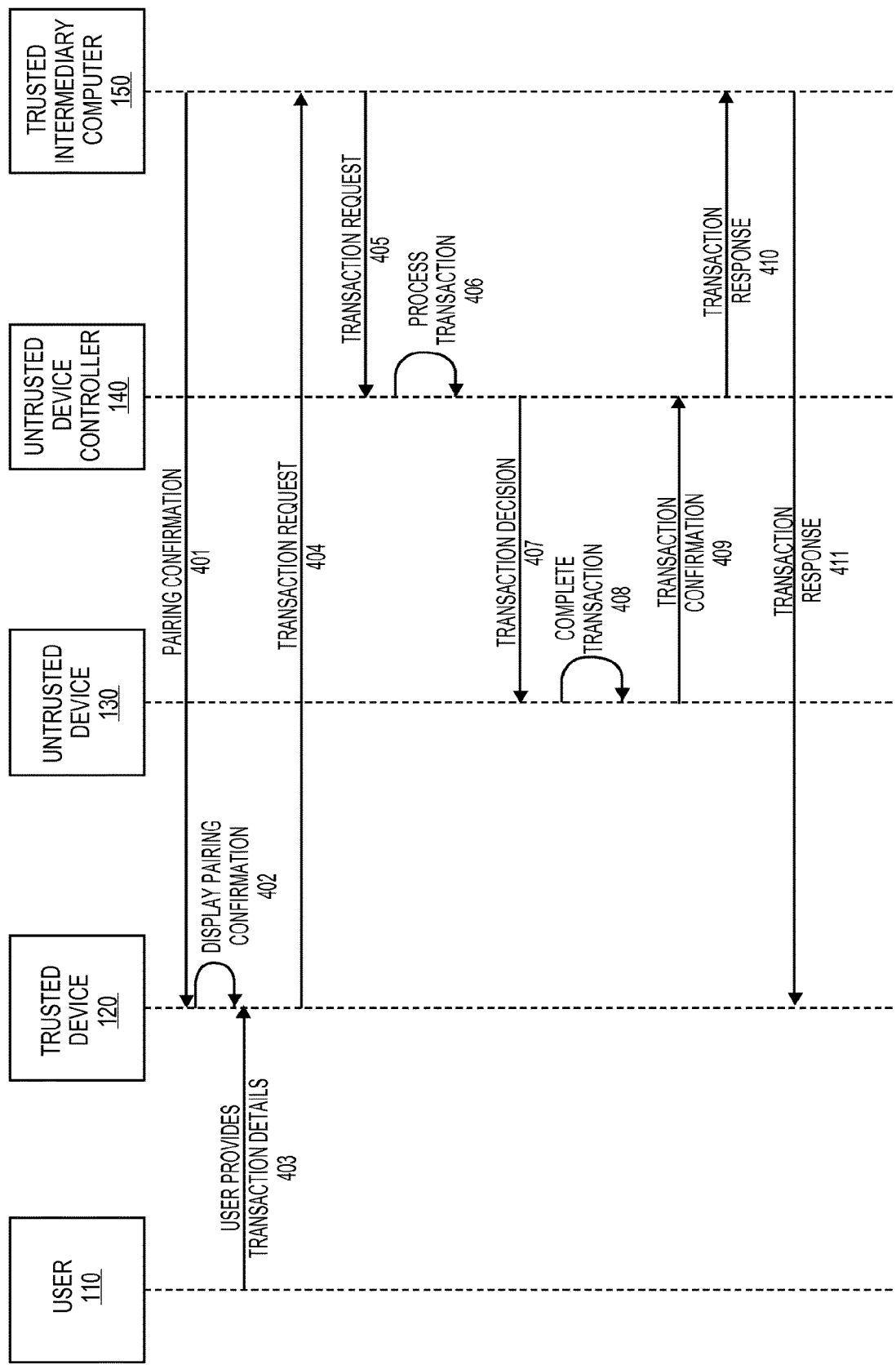
FIG. 4 illustrates an exemplary flowchart for a method of completing a transaction where the user uses an indirectly paired trusted device to complete a transaction with an untrusted device through a trusted intermediary and an untrusted device controller, according to an exemplary embodiment of the present invention.
Figure 5:
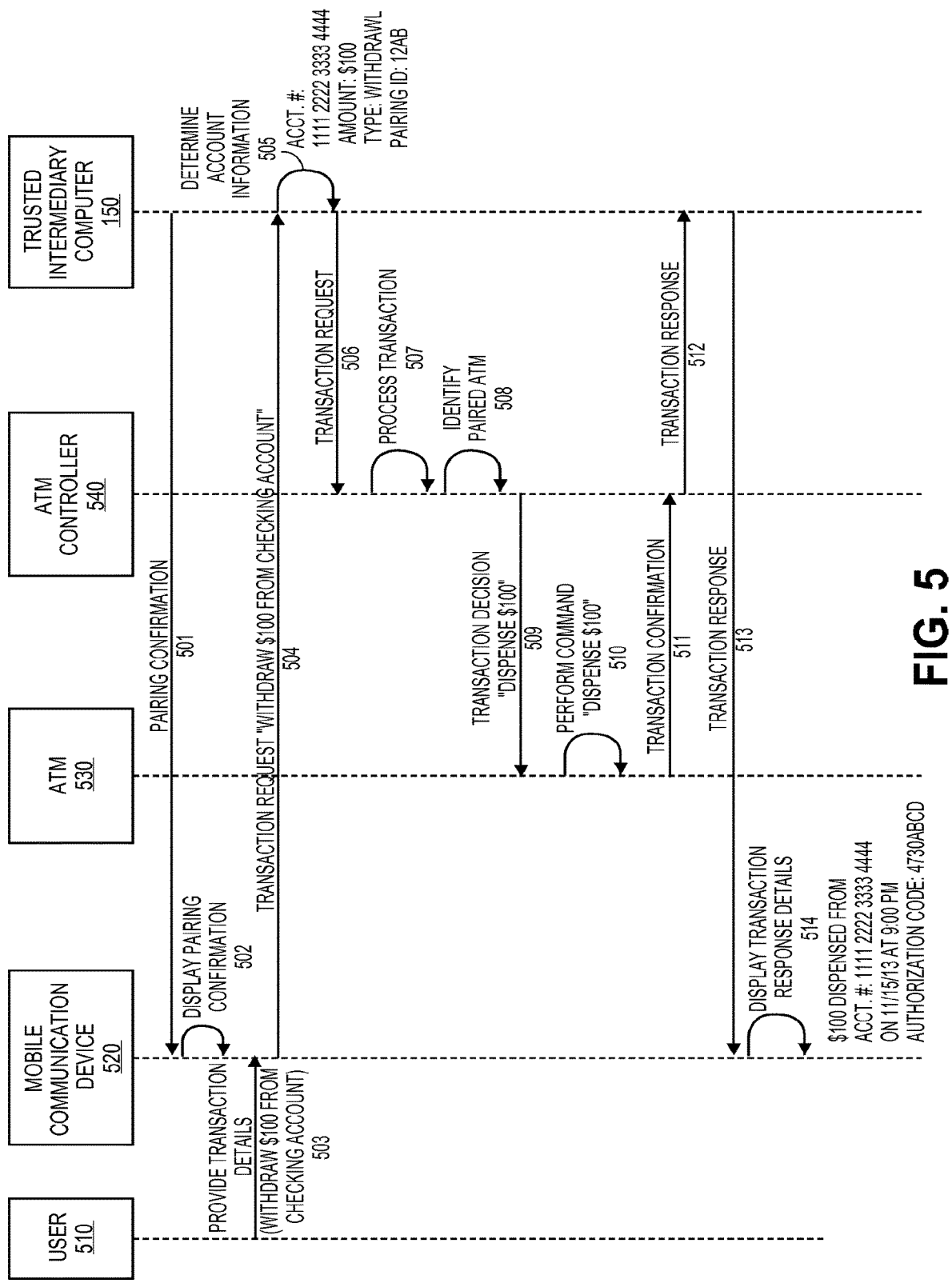
FIG. 5 illustrates an exemplary flowchart for an exemplary embodiment of the present invention where the user uses an indirectly paired trusted device to complete a withdrawal transaction with an untrusted ATM device through a trusted intermediary and an ATM device controller, according to an exemplary embodiment of the present invention.
Figure 6:
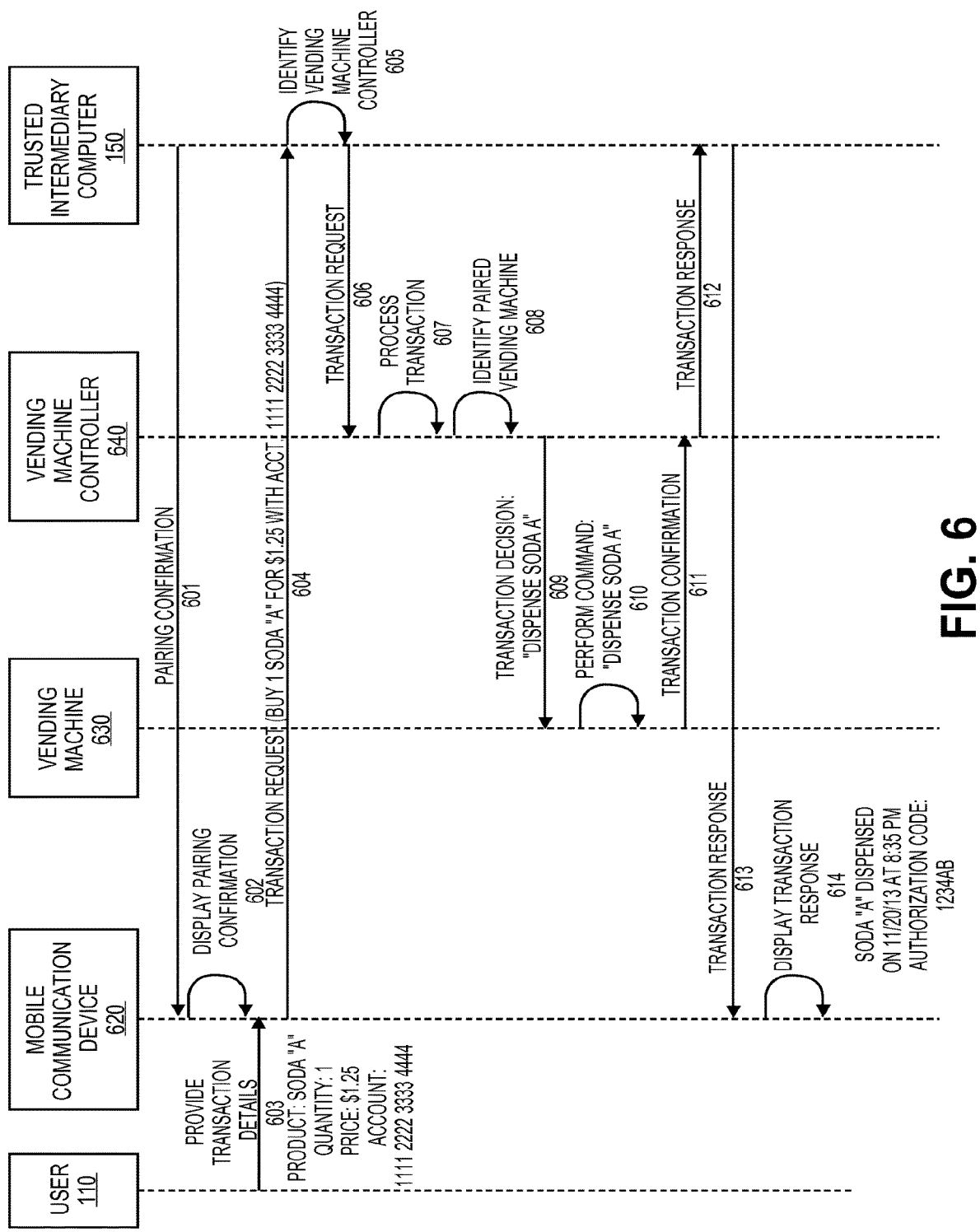
FIG. 6 illustrates an exemplary flowchart for an exemplary embodiment of the present invention where the user uses an indirectly paired trusted device to complete a transaction with an untrusted vending machine through a trusted intermediary computer and a vending machine controller, according to an exemplary embodiment of the present invention.

Further, as can be seen in FIGS. 4-6, step 322 of FIG. 3 (i.e., receiving a pairing confirmation at a trusted device 120) is a precondition for the flow charts provided in FIGS. 4-6. Accordingly, the methods shown in FIGS. 4 and 5 may occur after a trusted device 120 has been indirectly paired to an untrusted device 130.

B. Transaction Processing Methods for Indirectly Paired Devices

FIG. 4 illustrates an exemplary flowchart for a method of completing a transaction where the user uses an indirectly paired trusted device 120 to complete a transaction with an untrusted device 130 through a trusted intermediary computer 150 and an untrusted device controller 140, according to an exemplary embodiment of the present invention. As shown in steps 401 and 402, before the method of FIG. 4 may be initiated, the trusted device 120 may receive and display a pairing confirmation informing the user and the trusted device 120 that the trusted device 120 is indirectly paired with the untrusted device 130.

In step 403, the user provides transaction details to the trusted device 120 to initiate a transaction request. The user has now received confirmation from both the trusted intermediary computer 150 as well as the untrusted device 130 that their trusted device 120 is paired. Accordingly, the consumer may now be shown a number of options for performing a transaction or other actions with the untrusted device 130. The options provided by the trusted intermediary computer 150 application may be determined by information included in the pairing confirmation message. For example, the trusted intermediary computer may include a transaction template or transaction template identifier in the pairing confirmation that includes the appropriate transaction request possibilities associated with the untrusted device controller 140 that is indirectly paired with the trusted device 120.

Accordingly, the trusted device 120 may display a transaction template associated with the available transaction requests available to the user. Alternatively, the user may be provided with a generic transaction request for any transaction and the user may enter the transaction information to provide information regarding the type of transaction. The transaction details may include any relevant information to a transaction or action that the user may request. For example, the transaction details may include a type of transaction (e.g., ATM, purchase, entry to secure area, etc.), a quantity, a transaction value or price, a product identifier, an account identifier or account selection, or any other relevant information depending on the type of transaction or action being request. Two different types of transaction requests are explained below in FIGS. 5-6 and more explanation is provided regarding the transaction information that may be provided below.

In step 404, the trusted device 120 may generate a transaction request based on the provided transaction details and send the transaction request (or other command request) to the trusted intermediary computer 150. As explained above, the contents of the transaction request may depend on the configuration and type of entity being used as the trusted intermediary computer 150. For example, in some embodiments, a trusted intermediary computer 150 may store consumer details including financial information and other sensitive information in a user information database 152 at the trusted intermediary computer 150 and thus, the transaction request may merely include an account designation that corresponds to a enrolled user identifier or trusted device identifier (e.g., a username, device serial number, or phone number), an transaction type (e.g., withdraw or transfer), an account type (e.g., checking, savings, etc.), and an amount (e.g., $100). This type of transaction may take place in a single step, for example, the consumer may provide the pairing identifier along with a transaction amount, and the trusted intermediary computer 150 may accomplish the rest. Further, some embodiments may not include the pairing identifier in the transaction request and instead the trusted device identifier may be included (e.g., if the trusted device identifier is associated with the pairing identifier at the pairing identifiers database 151 of the trusted intermediary computer 150).

Alternatively, some trusted intermediaries may merely be a third party trusted gateway to an untrusted device controller 140 and as such, may not have any pre-enrolled information about the user. In this instance, the command or transaction request may include all of the account information and sensitive information that may be necessary in order to complete the transaction. This information may include the user's account number, PIN, expiration date, track 2 credit card data, etc. Accordingly, the command, transaction request, or other message sent to the trusted intermediary computer 150 in order to initiate the transaction, may be encrypted or otherwise protected from sniffing devices or other malicious third parties attempting to intercept consumer's communications.

In step 405, the trusted intermediary computer 150 receives the transaction request including the transaction information and sends the transaction request to the untrusted device controller 140. A similar process as described above in reference to step 314 may be performed to identify the correct untrusted device controller 140 for the transaction request. Depending on whether the trusted intermediary computer 150 is storing the consumer's information or is merely passing the information through to the untrusted device controller 140 as a trusted gateway, the trusted intermediary computer 150 may send the actual account number, a pseudo-account identifier, a temporary account number, or any other protected account identifier that may be used to later substitute for the account number in order to protect the consumer's sensitive information. If a pseudo-account number is used, the pseudo-account information may be passed to a payment processing network or other entity involved in the transaction so that the pseudo-account number may be replaced during the transaction.

For embodiments where the user's account information is stored at the trusted intermediary computer 150, the trusted intermediary computer 150 may identify account information associated with the consumer in the user information database 152, may update the transaction request to include the account information associated or indicated by the user, and may send the transaction request to the untrusted device controller 140.

Either way, the trusted intermediary computer 150 has now sent the transaction request, including the pairing identifier corresponding to the paired ATM, to the ATM back end. Accordingly, the ATM back end now has the user's account information including account identifier, PIN, expiration date, any other required track 2 data, without the user ever having to input any sensitive information into the hardware or software of the untrusted device ATM.

In step 406, the untrusted device controller 140 receives the transaction request and may perform any number of the steps described in steps 315-316 regarding the pairing request to determine and validate the pairing identifier and the untrusted device 130 that is associated with the transaction request. For example, the untrusted device controller 140 may extract the pairing identifier and match the information included in the transaction request (e.g., trusted intermediary identifier, trusted device identifier, and/or user account information) to the information stored in the associated pairing identifier entry in the pairing identifiers database 141.

Assuming the received information is validated and the trusted intermediary computer 150, trusted device 120, and/or user information matches the information in the pairing identifier entry, the untrusted device 130 may now have all of the typical transaction data that the untrusted device controller 140 may use in order to process a transaction. For example, the untrusted device controller 140 has the information associated with the untrusted device 130, user information, account information, transaction information, and any other information that it may desire may be provided by the trusted intermediary computer 150. Further, the untrusted device controller 140 may request additional information from the trusted intermediary computer 150 or trusted device 120 by sending a request for addition information to the trusted intermediary computer 150 (which may be forwarded to the trusted device 120).

Accordingly, the untrusted device controller 140 may process the transaction request. Any suitable process may be implemented for processing the transaction request and the process may be different for each type of transaction and type of untrusted device 130. For example, for a payment or ATM withdrawal transaction, the untrusted device controller 140 may generate an authorization request message and may forward the message to the payment network 170 including an acquirer, a payment processing network, and account issuer system for the transaction to be authorized. This transaction flow may occur through any suitable process, as one of ordinary skill in the art may recognize, and is a normal flow for a transaction, as the untrusted device controller 140 typically generates or routes such transaction requests during payment or ATM transactions. The untrusted device controller 140 may then wait for authorization to dispense the funds from the account issuer. Once authorization is received, the untrusted device controller 140 may determine whether the transaction is approved or declined and may forward the results to the associated untrusted device controller 140.

Alternatively, if the untrusted device 130 is a security keypad or other secure access device and the transaction request is secure access to the secure area, the untrusted device controller 140 may analyze the transaction request for the correct credentials (e.g., username, PIN, password, etc.) associated with the user account. Accordingly, the transaction may processed without transferring data or another request outside of the untrusted device controller 140.

In step 407, the untrusted device controller 140 identifies the untrusted device 130 (if not already identified during processing) and generates a transaction decision. The transaction decision may include any suitable command or series of commands for the untrusted device 130. For instance, returning to the payment or purchase transaction example, the untrusted device controller 140 receives an authorization response message that comprises a decision regarding the transaction. If the transaction is declined, the untrusted device controller 140 may generate a declined message and send the message to the untrusted device 130 for display to the user. However, if the transaction request is approved, the untrusted device controller 140 may send a typical command to the untrusted device 130 to complete the transaction (e.g., dispense the requested transaction amount, provide the product, etc.). For the secure access example, the untrusted device controller 140 may send a transaction decision that includes a command or series of commands to the untrusted access device to, for example, allow the user to enter the secure area or to inform the user that access is denied.

Further, in some embodiments, the transaction decision may not include any sensitive information in order to limit sensitive information being passed to an untrusted device 130. Accordingly, it is possible in some embodiments for the untrusted device 130 to never obtain any sensitive consumer information. In such embodiments, a receipt or other record of the transaction may be sent to the trusted device 120 through the trusted intermediary computer 150 instead.

In step 408, the untrusted device 130 completes the transaction and performs the commands provided in the transaction decision. For example, for a payment or purchase transaction, the ATM or vending machine may dispense money or a product to the user. Alternatively, for a secure access transaction request, an untrusted access device may allow a user to enter a secure area (e.g., unlock a door, etc.).

In step 409, the untrusted device 130 may generate and send a transaction confirmation to the untrusted device controller 140 to inform the controller that the requested action has been achieved.

In step 410, the untrusted device controller 140 may then send a transaction response to the trusted intermediary computer associated with the transaction request. The transaction response may include any and all information available to the untrusted device controller 140 including an authorization code, time of transaction, or any other information that normally may be included in a transaction receipt. Additionally, the pairing identifier, untrusted device information, trusted intermediary identifier, trusted device identifier, user account information, transaction decision message contents, and any other information available to the untrusted device controller 140 may be included in the transaction response.

In step 411, the trusted intermediary computer 150 may send the transaction response to the trusted device 120 to confirm that the transaction was completed. The transaction response may be altered by the trusted intermediary computer 150 to provide more or less information than received from the untrusted device controller 140. For example, the transaction confirmation may be as simple as "success," "approved," "failure," "declined," or may include any combination of the available information available to the untrusted device controller 140 and the trusted intermediary computer 150. The transaction confirmation message may be another fraud barrier that lets the consumer know if their account was used in a transaction through a trusted intermediary computer 150. Accordingly, if the consumer receives this message and is not physically present at an untrusted device 130 or otherwise did not authorize the transaction, the user can report the fraudulent charge and take steps to avoid liability and to catch the perpetrator.

Accordingly, a transaction request has now been accomplished via the indirect pairing with the trusted intermediary computer 150 and untrusted device controller 140, without requiring any passing of sensitive account information from the trusted device 120 to an untrusted device 130.

i. Exemplary ATM Transaction Request

FIG. 5 illustrates an exemplary flowchart for an exemplary embodiment of the present invention where the user 110 uses an indirectly paired trusted device 120 (e.g., mobile communication device 520) to complete a withdrawal transaction with an untrusted ATM device 530 through a trusted intermediary 150 and an ATM controller 540, according to an exemplary embodiment of the present invention. As explained above, steps 501-502 are completed during the indirect pairing described in FIG. 3. Further, as many of these steps have been described above, the description provided below may merely point out differences or give examples of specific information that may be provided for an ATM transaction request and each step may not be described in detail.

At step 503, the user 110 receives the pairing confirmation and provides transaction details for the ATM transaction request. For instance, the user 110 may be presented with a number of options that may be available to the particular ATM controller 540 associated with the untrusted ATM device 530 that the trusted device 120 (e.g., mobile communication device 520) is paired with. For example, the user 110 may be provided with options to withdraw funds, deposit funds, transfer funds, check a balance, etc. The user 110 may select withdraw, may select an account to withdraw from (e.g., checking, savings, etc.), and may enter an amount to withdraw (e.g., $100). The user 110 may review their transaction details and may provide a user input (e.g., press a send or submit button) on the mobile communication device 520 in order to generate a transaction request.

At step 504, the trusted intermediary application operating on the mobile communication device 520 may generate a transaction request including that the transaction is an ATM withdrawal request for $100 from the user's checking account. As can be seen in FIG. 5, the user's account information is not included in the transaction request. Instead, the user 110 merely indicates that the user's checking account is selected. Accordingly, in order to perform a transaction, the trusted intermediary computer 150 may determine a checking account associated with the authenticated mobile communication device 520 and/or user 110 and substitute the account information into the transaction request.

At step 505, the trusted intermediary computer 150 receives the transaction request and determines account information associated with the transaction request. As explained previously, in some embodiments, a trusted intermediary 150 may store sensitive consumer information for registered users such that the trusted intermediary computer 150 has access to the user's sensitive information upon authentication (e.g., the user enrolls in a pairing service and registers their financial information with the trusted intermediary computer 150 during enrollment). As can be seen, the trusted intermediary computer 150 may identify a consumer checking account identifier (e.g., "1111222233334444") associated with the transaction request.

Alternatively, although not shown in FIG. 5, a trusted intermediary 150 may merely pass sensitive information received from the mobile communication device 520 during the pairing transaction to the ATM controller 540 (e.g., a consumer is authenticated and provides sensitive information during the transaction). For example, a trusted device 120 (e.g., a user's mobile communication device, smartphone, etc.) can be used with an electronic wallet on a mobile communication device 520 since the electronic wallet already has personal information (bank information, phone number, etc.) for the consumer or user stored on the digital wallet or stored at the mobile communication device 520.

At step 506, the trusted intermediary computer 150 substitutes the determined account number into the transaction request and sends the transaction request to the ATM controller 540. For example, the transaction request sent from the mobile communication device 520 of the user 810 did not include a pairing identifier or an account number. However, the transaction request sent from the trusted intermediary computer 150 to the ATM controller 540 may include the pairing identifier ("12AB") and an account identifier ("1111222233334444"). This information may be identified in the user information database 152 and the pairing identifiers database 151 located at the trusted intermediary computer 150.

At step 507, the ATM controller 540 receives and processes the transaction request. Although not shown in FIG. 5, the ATM controller 540 may further validate and ensure that the transaction request is being received from the appropriate trusted intermediary computer 150 associated with the locked pairing identifier. As explained above, the transaction request may be formatted according to a predetermined format associated with an ATM controller profile provided during enrollment of the ATM controller 540 such that the ATM controller 540 receives the transaction request format that the ATM controller 540 is used to receiving for a transaction. Alternatively, the ATM controller 540 may receive the transaction request from the trusted intermediary computer 1560 and may reformat the transaction request and generate an authorization request message based on the receive transaction request. The ATM controller 540 may receive an authorization response message from the payment network 170 and may determine whether the ATM transaction request is approved or declined.

At step 508, the ATM controller 540 identifies the ATM 530 that the transaction request is associated with. The ATM controller 540 may also perform any of the steps described in FIGS. 3 and 4 above to authenticate, validate, and ensure the transaction request is valid (including identifying if a second expiration condition (e.g., transaction expiration condition) has been triggered). The ATM controller 540 may further validate the user's information, the transaction information, and may request additional authentication or other transaction information from the trusted intermediary computer 150 or the user 110 by sending a request for additional information through the trusted intermediary 150 to the mobile communication device 520. Further, the ATM controller 540 may identify the paired ATM 530 before processing the transaction request if knowing the specific identified ATM 530 is useful for the transaction processing step.

At step 509, the ATM controller 540 generates and sends a transaction decision or transaction command to the identified ATM 530. For example, in FIG. 5, the ATM transaction request is approved by the payment network 170 and the ATM controller 540 sends a transaction decision including "Dispense $100" to the ATM 530.

At step 510, the ATM 530 receives the transaction decision and performs any commands associated with the transaction decision. For example, the ATM 530 dispenses the $100 to the user as a result of receiving the command to dispense $100.

At step 511, the ATM 530 generates and sends a transaction confirmation to the ATM controller 540. At step 512, the ATM controller 540 receives the transaction confirmation and generates a transaction response including more information than is provided to the ATM 530. For example, the transaction response may include the account number ("1111222233334444"), the time and date of the transaction (11/15/13 at 9:00 pm), and an authorization code ("4720ABCD") received from the payment network 170.

At step 513, the transaction response is received at the mobile communication device 520 and displayed to the user 110. Accordingly, if the user 110 did not authorize the transaction, they may alert their account issuer and/or the trusted intermediary computer 150 and provide the specific information that may identify the transaction and allow for easier reimbursement or charge-back.

ii. Exemplary Vending Machine Purchase Transaction Request

FIG. 6 illustrates an exemplary flowchart for an exemplary embodiment of the present invention where the user 110 uses an indirectly paired trusted device 120 (e.g., mobile communication device 620) to complete a transaction with an untrusted vending machine 630 through a trusted intermediary computer 150 and a vending machine controller 640, according to an exemplary embodiment of the present invention. Accordingly, FIG. 6 shows an example of how one exemplary embodiment of the indirect pairing system may work with another untrusted device, a vending machine 630 instead of an ATM device 530.

As can be seen in FIG. 6, most of the steps are very similar to those in FIG. 5. However, the transaction details provided by the user 110 identify a product offered by the vending machine 620 (e.g., soda "A") and a transaction amount that may be credited to the vending machine 620 to be used for products (e.g., $1.25 that may be used to buy soda "A") instead of a withdrawal amount for an ATM transaction. Accordingly, after the user 110 receives a pairing confirmation from both the untrusted vending machine 620 and the trusted intermediary computer 150 (steps 601-602) that the mobile communication device 620 is paired to the untrusted vending machine 630, the user 110 may launch an application or webpage from their mobile communication device 620 (e.g., smart phone, tablet, etc.). The user 110 may enter the type of untrusted device they are paired with (e.g., a vending machine 630 operated by XYZ Corp.) or the mobile communication device 620 (e.g., smart phone) may be informed during the pairing process of the type of untrusted device (e.g., vending machine 630) and the transaction options that are available (e.g., the products offered by the particular vending machine 630). Accordingly, the user 110 may be provided with a menu of options for completing the transaction (e.g., different types of sodas offered or different products available for purchase).

At step 603, the user 110 may select transaction details for the transaction request including a product and/or amount for the transaction (e.g., Soda "A" and/or $1.25), a quantity (e.g., one), and an account (e.g., "credit"). At step 604, the user 110 may press the submit button to generate and send a vending machine purchase transaction request to the trusted intermediary computer 150.

In step 604, the mobile communication device 620 (e.g., user's mobile smartphone) may send the transaction request to the trusted intermediary computer 150 with the pairing identifier (e.g., "12AB"), their account number (e.g., "1111222233334444") (where the user 110 has not previously enrolled their financial information with the trusted intermediary 150), a product identifier, a transaction amount, or any other required information in order for the transaction to be completed. The transaction request may be accomplished in a single step or may be split into multiple messages to first send the user's secure financial information and then send the transaction information, for example. In FIG. 6, the user 110 has not previously provided their account information so the account information is sent in the transaction request. This may be accomplished without a user 110 inputting the information individually by integrating with a mobile wallet or other application on the mobile communication device 620 that stores the consumer's account information.

In step 605, the trusted intermediary 150 identifies the vending machine controller 640 associated with the transaction request (using the pairing identifier or the user information) and forwards the transaction request to the vending machine controller 640.

In steps 606 and 607, the vending machine controller 640 receives the transaction request and processes the transaction request using the transaction details contained in the transaction request. The vending machine controller 640 may process the transaction as any other typical transaction that it receives through the vending machine 630. For example, the vending machine controller 640 may generate an authorization request message that may be sent to a payment network 170 including an acquirer, payment processing network, and issuer associated using the account information that is passed to the vending machine controller 640. The vending machine controller 640 may then receive an authorization response message informing the vending machine controller 640 whether the transaction is authorized.

In steps 608-609, the untrusted vending machine controller 640 may complete the transaction by identifying the indirectly paired vending machine 630 and sending a transaction decision to the vending machine 630. If the transaction is authorized, the vending machine controller 640 may generate and send a transaction decision including "Dispense Soda 'A'" to dispense the selected soda to the user 110. In other embodiments, the vending machine controller 640 may credit the untrusted vending machine 630 with the amount requested in the action request (e.g., $1.25) that was the subject of the transaction request. Thereafter, the user 110 may request the particular product that would like from the vending machine 630.

In step 610, the untrusted vending machine 630 performs any commands received in the transaction decision. For example, the vending machine 630 dispenses one soda A. In step 611, the vending machine 630 generates and sends a transaction confirmation to the vending machine controller 640 notifying the vending machine controller 640 of a successful dispensing of the product.

In step 612, the vending machine controller 640 generates a transaction response including the relevant information for generating a receipt for the vending machine transaction and sends the transaction response to the trusted intermediary computer 150. In step 613, the trusted intermediary computer 150 forwards the transaction confirmation to the user's mobile communication device 620 to ensure the user 110 is aware that their account was used to complete a transaction and provide a receipt of the transaction.

iii. Exemplary Remote Money Transfer Transaction Request

Figure 7:
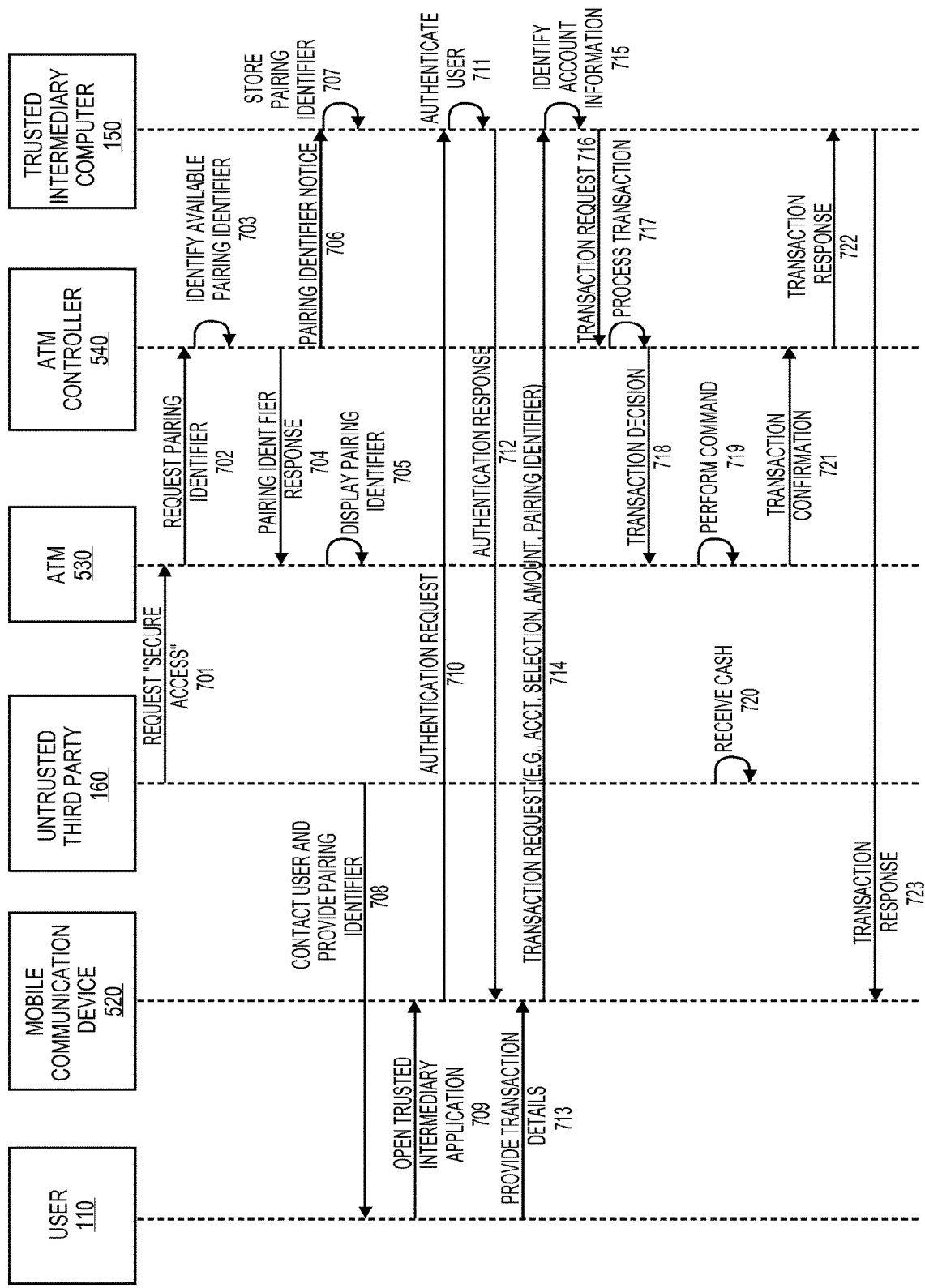
FIG. 7 illustrates an exemplary flowchart for an exemplary embodiment of the present invention where the user uses an indirectly paired trusted device to complete a remote transaction with an untrusted third party and an untrusted ATM device through a trusted intermediary computer and an ATM device controller, according to an exemplary embodiment of the present invention.

FIG. 7 illustrates an exemplary flowchart for an exemplary embodiment of the present invention where the user uses an indirectly paired trusted device 120 (e.g., mobile communication device 520) to complete a remote transaction with an untrusted third party 160 and an untrusted ATM device 530 through a trusted intermediary computer 150 and an ATM device controller 540, according to an exemplary embodiment of the present invention. In the remote transaction embodiment, a third party beneficiary 160 may provide the pairing identifier to the user 110 operating the mobile communication device 520 where the user 110 is located remotely from the ATM device 530. Accordingly, a user 110 can use a trusted intermediary computer 150 to dispense money to a third party 160 from a remote location without having to provide sensitive account information to a third party 160 (e.g., may send daughter to ATM without providing PIN or account information) and thus without fear of "familiar fraud," or a trusted party using an account in an unauthorized manner.

In steps 701-707, an untrusted third party 160 located at an ATM 530 initiates a pairing request at the ATM 530, much as the user 110 had initiated a secured transaction with an ATM 530 in the flowchart of FIG. 3 (step 301-307). However, in the present embodiment, the untrusted third party 160 at the ATM 530 is not the user 110 or consumer that has access to the mobile communication device 520. Accordingly, when the ATM device 530 displays the pairing identifier in step 705, the untrusted third party 160 located at the ATM 530 does not enter the number into their trusted device (not shown) and instead relays the pairing identifier to a user 110 that may use their mobile communication device 520 to complete a transaction from a remote location from the ATM 530.

Accordingly, in step 608, an untrusted third party beneficiary 160 or the recipient of money informs a user 110 of the trusted mobile communication device 520 of the pairing identifier for the ATM 530 (or other untrusted device, for example, vending machine). Therefore, the user 110 does not have to be present at the ATM 530 or vending machine (not shown) in order to complete a successful transaction, as long as the correct pairing identifier is provided by the untrusted third party 160. For example, a user 110 may send money to their daughter by sending their daughter to an ATM 530. The daughter could enter the "secure entry" button on the ATM 530, receive a pairing identifier for the ATM 530, and call or text the user 110 with the pairing identifier.

In steps 709-712, the user 110 may open the trusted intermediary application or access the pairing identifier web page on their mobile communication device 520 and may authenticate themselves to the trusted intermediary computer 150 as described in FIG. 3 above.

In step 713, the user 110 may use the received pairing identifier from the beneficiary 160 to generate a transaction request comprising the pairing identifier and any other information, for example, the ATM 530 identification information (e.g., ATM network provider, etc.), geographic information (city, state, zip code, etc.), or any other relevant information to the ATM 530. The user 110 may obtain this information from the call or text from the third party beneficiary 160 who is physically present at the untrusted ATM device 530.

In steps 714-723, the transaction request process may be completed as described previously regarding FIG. 3. Unlike FIG. 3, the steps shown in FIG. 7 show an embodiment where the pairing process and the transaction request process are combined into a single process flow. All of the substantive steps may be included in the present flow including the identifier, associating, and locking of the pairing identifier. However, the steps may occur in a single step such that the pairing request and the transaction request may be included in a single message. Accordingly, the ATM controller 540 may determine whether the pairing identifier is valid, associate the pairing identifier with the trusted intermediary computer 150, and may lock the pairing identifier with the mobile communication device 520 and/or trusted intermediary computer 150, and then process a transaction in a single step. However, the user 110 may not receive a pairing response and may not receive the multiple confirmation messages that the correct ATM 530 is paired with the mobile communication device 520. Instead, these steps may occur but in a shorter time frame than previously or may be combined into a single message (e.g., transaction response). Accordingly, the pairing confirmation may be provided to the ATM 530 and shown to the untrusted third party 160 and the untrusted third party 160 may inform the user 110 through text or a call that the devices are now paired. Therefore, either process may be used in these embodiments, and the integrated request is provided in FIG. 7 only to provide another exemplary flow that may be incorporated in some embodiments.

In embodiments where the flows shown in FIGS. 3-6 are used, the ATM controller 540 may send a confirmation message to the ATM 530 to be displayed to the third party beneficiary 160 that the ATM 530 is now paired with the mobile communication device 520. The confirmation message may comprise some identification information about the mobile communication device 520 to inform the third party beneficiary 160 that the correct mobile communication device 520 has been paired. Additionally, the trusted intermediary computer 150 may send a confirmation message to the user 110 operating the mobile communication device 520 that the mobile communication device 150 is now paired with the ATM 530. The confirmation message may comprise untrusted device identification information to inform the user 110 that the correct ATM 530 has been paired. The untrusted third party 160 and the user 110 may now contact one another to inform each other that they have both received a confirmation message. The mobile communication device 520 is now indirectly paired with the untrusted ATM 530 for the third party beneficiary 160 and a transaction may be initiated by the user 110 to transfer any amount of money from the user's account (which is connected through the mobile communication device 520) and may be dispensed to the untrusted third party 160. Accordingly, the user 110 does not have to provide any sensitive information to the third party beneficiary 160 or a potentially infected untrusted device 530 to complete a remote transaction.

Additionally, embodiments of the present invention may be used to implement any type of value transfer system that could send money and value from one entity to another across any distance without a user 110 losing control over the terms, security, or privacy of their personal information. Further, the untrusted third party 160 and the untrusted ATM 530 may not receive any personal or sensitive information about the user 110 during the transaction.

Figure 8:
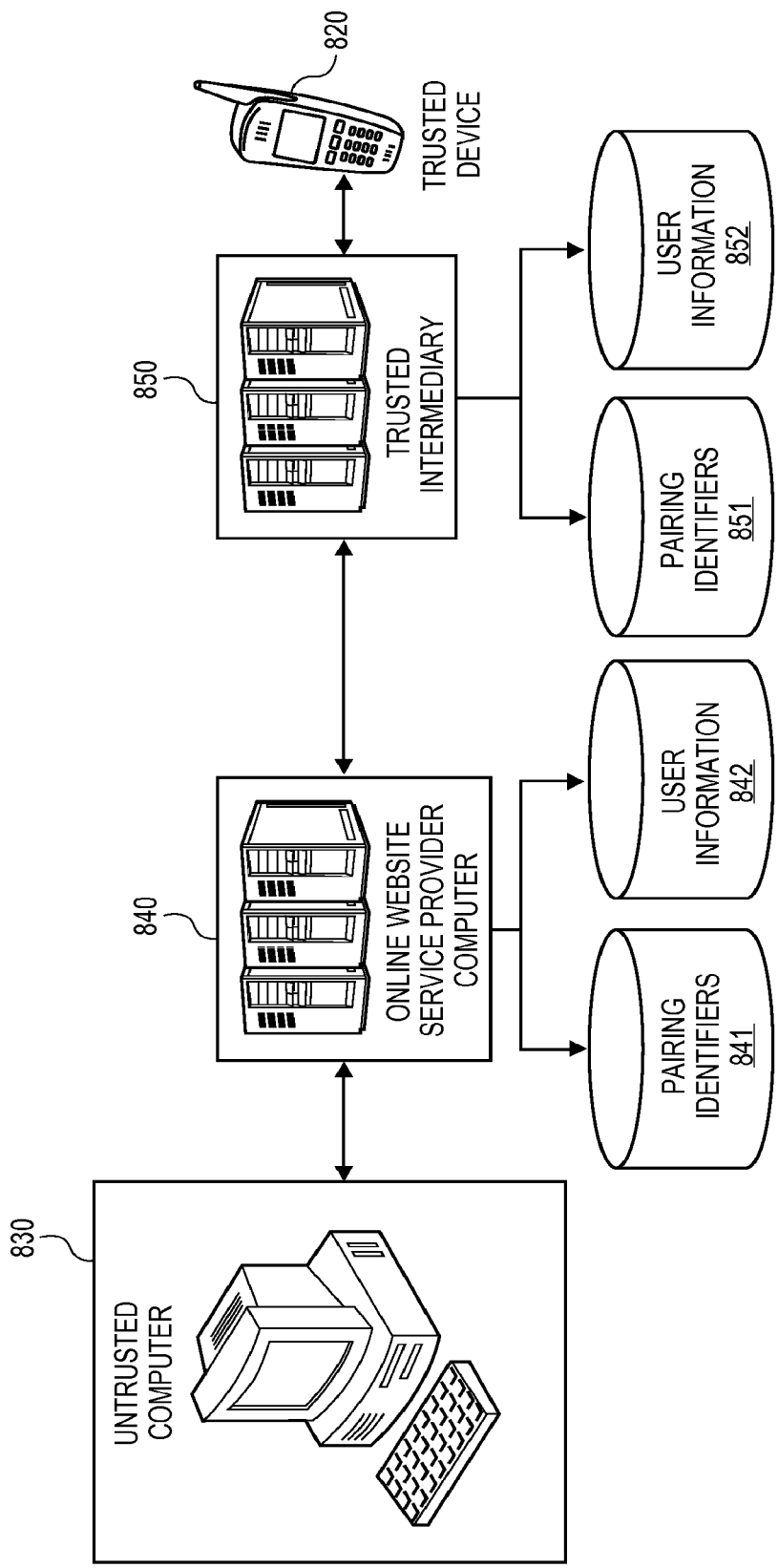
FIG. 8 illustrates an exemplary block diagram of a system for indirectly pairing a trusted device with an online host of a website with restricted access rights through an untrusted computer and a trusted intermediary computer, according to an exemplary embodiment of the present invention.

III. Exemplary Systems for Secure Access to Restricted Information Through an Untrusted Device FIG. 8 illustrates an exemplary block diagram of a system for indirectly pairing a trusted device 120 with an online host of a website with restricted access rights through an untrusted computer and a trusted intermediary computer, according to an exemplary embodiment of the present invention.

In this embodiment, the untrusted device 830 may include a public computer operating a web browser. For example, a user may be traveling and may use a publicly accessible computer in a cybercafé. The untrusted public computer 830 may have malicious software (a keystroke tracker or keystroke logging software) or may be observed by a third party or camera. Accordingly, the user 810 may not want to enter their sensitive information (e.g., username, password, social security number, PIN, etc.) into the computer 830 but may want to access secure services or information such as their email, online bank account, etc., from an online host service provider computer 840. Accordingly, the user 810 may use embodiments of the present invention to contact a trusted intermediary computer 850 that may be in communication with an online host server computer 840 (also referred to as an "online website service provider computer") that operates a secure website (e.g., email account, bank website, etc.). The online website server provider computer 840 may provide similar functionality as the untrusted device controller 140, described above, because the online host computer 840 controls the secure content that is delivered to the untrusted device 830.

The online website server provider computer 840 may include any server computer that stores and delivers secure information to registered users 810. For example, an online website service provider computer 840 may include a secure email account provider, enterprise email service, or any other service provider (e.g., a bank, online newspaper, or a publication database that requires user credentials for access, etc.). The main difference between the online website service provider computer 840 and the untrusted device controller 140 of the earlier embodiments is that the online website service provider may not have direct control over the untrusted public device 830. Further, the online websites server provider 840 may store user credentials and account information in a user information database 842. The user information database 842 may comprise credentials for users 810 that are registered and have access rights at the online website service provider computer 840. Accordingly, the online website service provider computer 840 may use the indirect pairing system to receive user credentials, compare the user credentials to stored user information, authenticate the user, and provide access to secure information to an untrusted computer. The online website service provider computer 840 may comprise any number of software modules in order to complete the functionality described herein.

Further, the trusted intermediary computer 850 may be the same entity that previously communicated with the untrusted device controller 140 in the previous embodiment (see FIG. 2). Accordingly, the trusted intermediary computer 850 may be configured to communicate across multiple communication networks (e.g., the internet, proprietary closed-network transaction network, wireless communication networks, etc.) depending on the type of service in which they are being requested to pair a trusted device 820. Furthermore, the trusted device 820 and the trusted intermediary application operating on the trusted device 820 may also be the same device and may application as described above in reference to FIG. 2.

Figure 9:
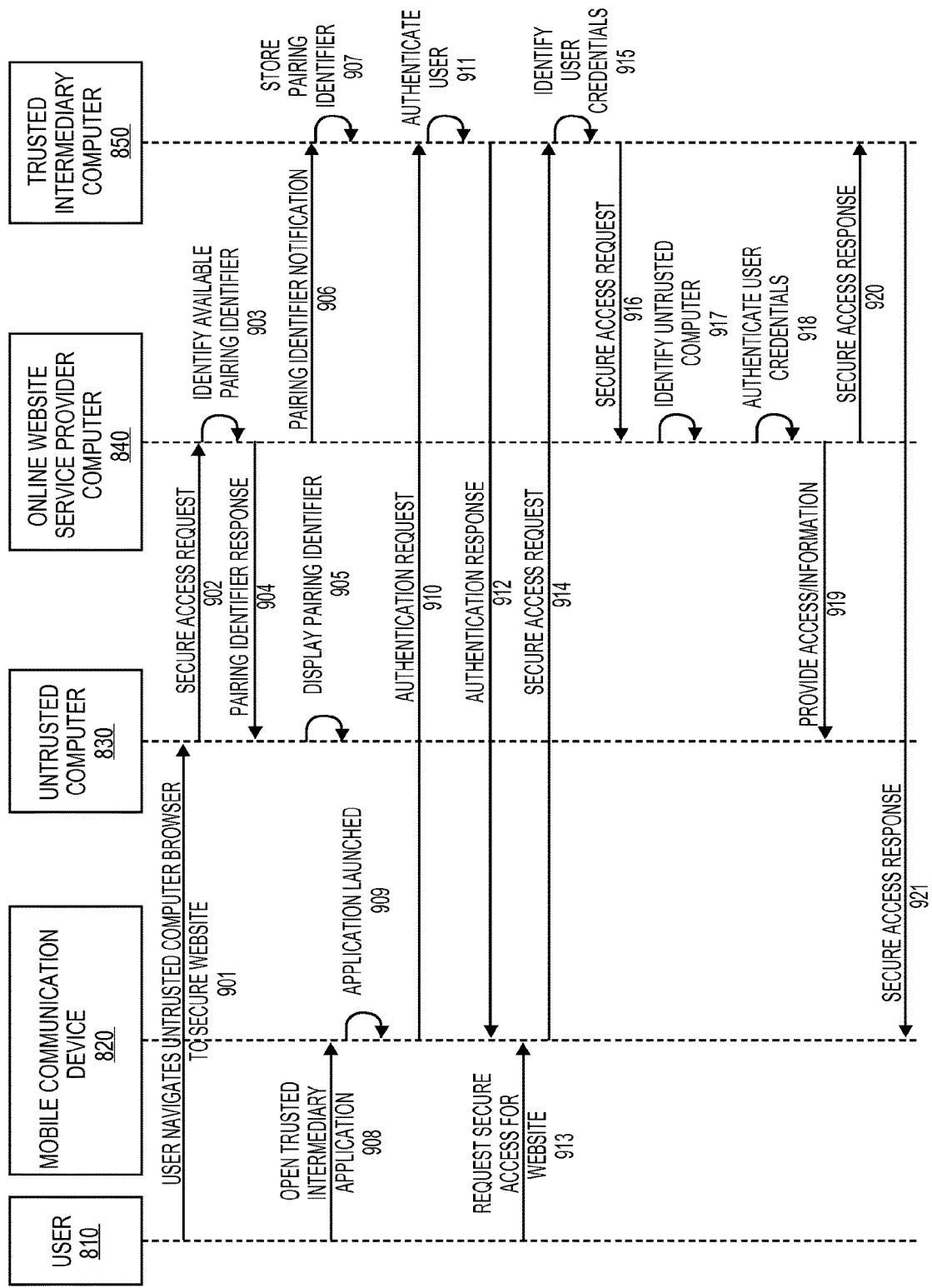
FIG. 9 illustrates an exemplary flowchart for an exemplary embodiment of the present invention where a user indirectly pairs their trusted device with an online host through an untrusted browser and/or access device operating on an untrusted computer through a trusted intermediary computer and completing a secure access transaction, according to an exemplary embodiment of the present invention.

IV. Exemplary Methods for Indirectly Pairing Trusted Devices with Website Hosts FIG. 9 illustrates an exemplary flowchart for an exemplary embodiment of the present invention where a user 810 indirectly pairs their trusted device 120 with an online website service provider computer 840 (also referred to as a "host") through a trusted intermediary computer 850 and completes a secure access transaction on an untrusted browser operating on an untrusted computer 820, according to an exemplary embodiment of the present invention.

Embodiments of the present invention may be used for a variety of transaction requests that are not directly related to financial transactions. For example, embodiments of the present invention may be used to access secure information of a secure website server computer 840 when using a public computer 830 or any other suitable implementation where sensitive information may be entered into a public device. For example, a user may use a trusted intermediary computer 850 as a pairing service that transfers sensitive information to a remote server (a.k.a. an online host server computer 840) instead of providing sensitive data to untrusted public computer 830 that may skim, steal, or be monitored by a malicious third party.

Accordingly, a trusted intermediary computer 850 may store sensitive consumer information (e.g., credentials) for registered users such that sensitive information is sent upon authentication of a trusted device 820 or a trusted intermediary computer 850 may merely pass sensitive information (e.g., credentials) received from a trusted device 820 to an online host server computer 840. In this manner, the user 810 can use the trusted intermediary computer 850 to access an online secure area of a website that requires sensitive login credentials, without entering sensitive information in a public environment (e.g., a user 810 may log into email account without entering username/password on a public computer 830 in a cybercafé).

In step 901, the user 810 navigates a browser operating on an untrusted computer 830 to a secure online account access webpage (e.g., secure email homepage) without logging in or providing any personal or sensitive information. The homepage for their online account access webpage may have a "Secure Access" button or other similar functionality provided by the online website server provider computer 840. Accordingly, the user may click on the "Secure Access" button of the delivered web page to inform the online website service provider computer 840 that they would like to log into their account through a secure access mode.

In step 902, the untrusted browser or access interface operating on the untrusted computer 830 generates a pairing identifier request or secure access request that informs the online account provider computer 840 that secure access log-in mode has been requested.

In step 903, the user's online account provider may operate similarly to those steps described in reference to FIG. 3 above. Accordingly, the service provider computer 840 may identify or generate a unique pairing identifier, set one or more expiration conditions for the available pairing identifier, and inform the trusted intermediary computer 850 of the unique identifier through a pairing identifier notification.

In steps 904-905, the online account provider computer 840 may send a pairing identifier response including the available pairing identifier to the untrusted computer 830. The untrusted computer 830 may display the available pairing identifier and any other identifier or information that may be entered in order to identify the pairing identifier to the user 810 through the untrusted computer's browser 830.

In steps 908-912, the user 810 opens an application or accesses a web page on their trusted device 820 and requests access to the trusted intermediary computer 850, authenticates themselves to the trusted intermediary computer 850, and receives a confirmation that they are authenticated as described above in FIG. 3.

In steps 913-914, the user 810 may submit a secure access request including a request to log into the untrusted browser operating on the untrusted computer 830 to the secure website operated by the user's online account provider computer 840. The secure access request may include identification information for the service provider (e.g., email service "A"), the pairing identifier, and any other necessary information for informing the trusted intermediary computer 850 of the appropriate online account provider computer 840 to contact in order to log the user 810 into the website. The secure access request may either include the user's credentials, if not already stored in the user information database 852 at the trusted intermediary computer 850, or may merely include an identifier to allow the trusted intermediary computer 850 to identify the user account and the corresponding credentials.

In step 915, the trusted intermediary computer 850 identifies the user credentials (if stored in the user information database 852), determines the relevant service provider computer 840 for the secure access request, and sends a message including the user credentials to the relevant online website service provider computer 840.

In steps 916-918, the online website service provider computer 840 may receive the secure access request and may process it similarly to the untrusted device controller 140 described in reference to FIGS. 3-7 above. The differences may include that the online website service provider computer 840 may perform the secure access transaction by authenticating received user credentials in the secure access request. Accordingly, no external messages are sent to outside processors (although they could be if the system uses a third party authentication system) and instead of a transaction decision being provided to the untrusted device 830, the secure information is provided if the transaction is successful.

Further, in step 917, the identification of the untrusted computer 830 may include logging the untrusted computer's internet protocol (IP) address, untrusted computer serial number, or any other unique identifier or combination of unique identifiers that may allow the online website service provider computer 840 to identify the specific public computer 830 being used by the user 810 in the pairing identifiers database 841.

In step 919, if the user's received credentials are authenticated with the stored credentials at the online website service provider computer 840, the online website service provider computer 840 may send requested secure information to the browser of the untrusted computer 830. The untrusted computer 830 may be identified by the untrusted device's internet protocol (IP) address or any other untrusted device identifier provided by the user 810 through the trusted intermediary computer 850. Accordingly, the user 810 may know that their trusted device 820 is indirectly paired with the user's online account provider computer 840.

In steps 920-921, the trusted intermediary computer 850 receives a secure access response that the transaction is successful and sends the secure access response message to the user's trusted device 820 to inform the user 810 that the trusted device 820 is now indirectly paired with the user's online account provider and that the secure access transaction has been completed.

V. Additional Embodiments

Additionally, a number of other embodiments could conceivably be implemented using teachings of the above embodiments. For example, pairing could be implemented through sound, bumping of a trusted device 120 to receive a pairing identifier without providing any sensitive information, using QR codes, or any other sensitive passing of information in a public untrusted environment. The exemplary methods and systems provided herein are merely examples of potential uses and the steps may be combined, the order may be changed, and additional steps may be added as one of ordinary skill in the art would recognize.

Figure 10:
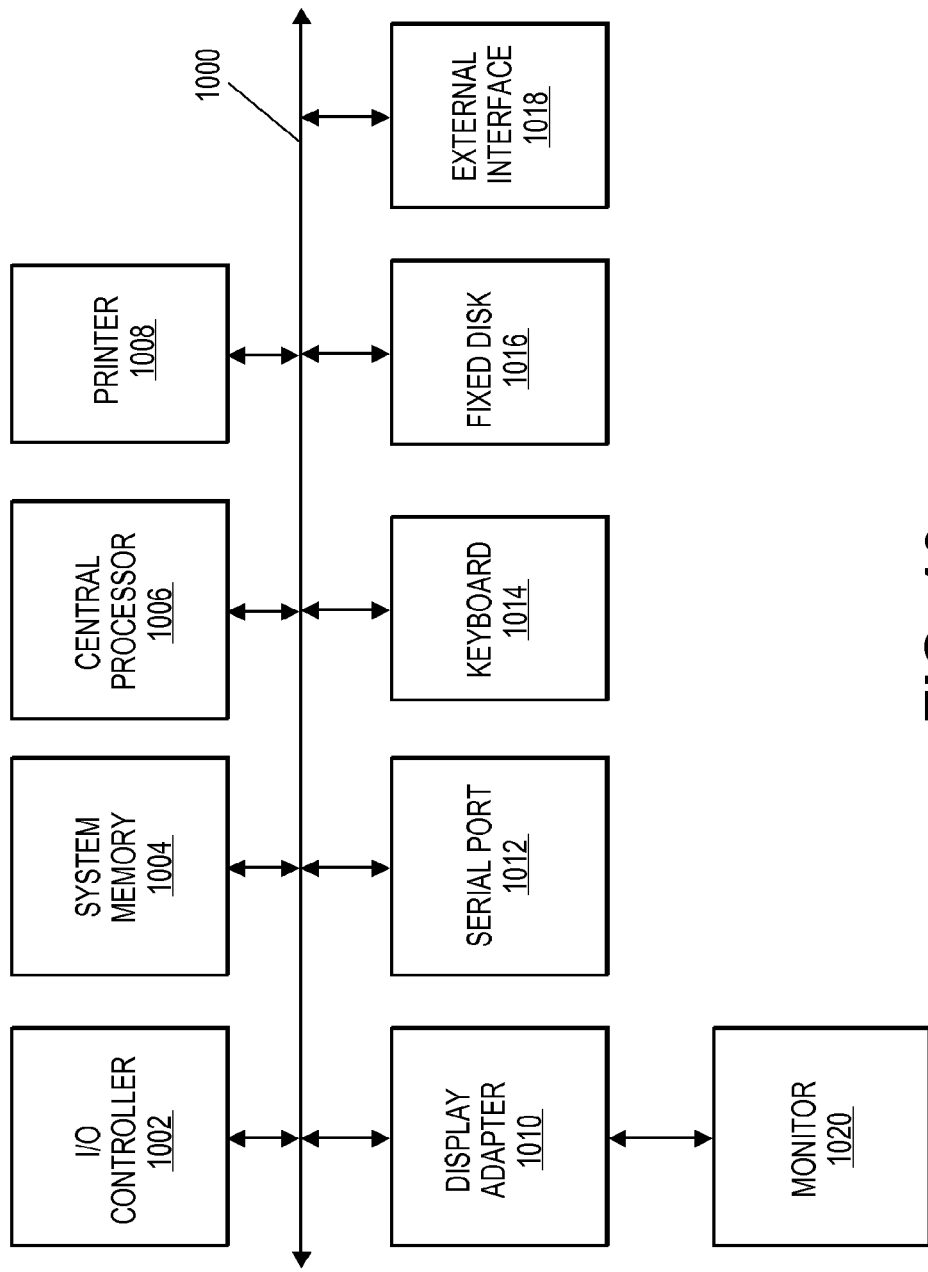
FIG. 10 illustrates a block diagram of a computer apparatus.

FIG. 10 illustrates a block diagram of a computer apparatus. The various participants and elements in FIGS. 1-9 may operate one or more computer apparatuses (e.g., a server computer) to facilitate the functions described herein.

Any of the elements in FIGS. 1-9 may use any suitable number of subsystems to facilitate the functions described herein. Examples of such subsystems or components are shown in FIG. 10. The subsystems such as a printer 1008, keyboard 1014, fixed disk 1016 (or other memory comprising computer readable media), monitor 1020, which is coupled to a display adapter 1010, and others are shown. Peripherals and input/output (I/O) devices, which couple to I/O controller 1002, can be connected to the computer system by any number of means known in the art, such as serial port 1012. For example, serial port 1012 or external interface 1018 can be used to connect the computer apparatus to a wide area network such as the Internet, a mouse input device, or a scanner. The interconnection via system bus allows the central processor 1006 to communicate with each subsystem and to control the execution of instructions from system memory 1004 or the fixed disk 1016, as well as the exchange of information between subsystems.

Figure 11:
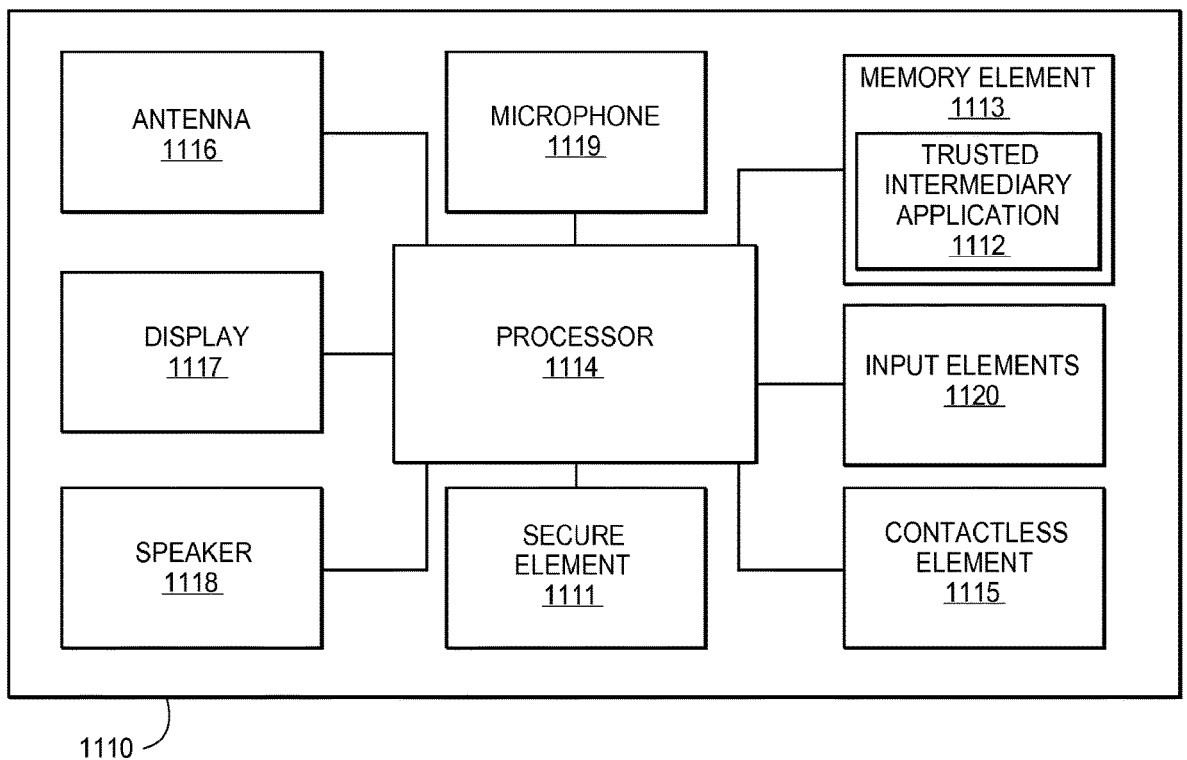
FIG. 11 illustrates a block diagram of a trusted device.

FIG. 11 illustrates a block diagram of a trusted device (e.g., a mobile communication device). The trusted device (e.g., mobile communication device) 1110 may comprise a memory element 1113 (i.e. computer-readable medium) and a body. FIG. 11 shows a number of components, and a mobile communication device 1110, according to embodiments of the invention, may comprise any suitable combination or subset of such components. The memory element 1113 may be present within the body of the mobile communication device, or may be detachable from it. The body may be in the form a plastic substrate, housing, or other structure. The memory element 1113 may be a memory that stores data and may be in any suitable form including a magnetic stripe, a memory chip, etc.

The memory element 1113 may comprise code executable by a processor for a trusted intermediary application 1112. As described above, the trusted intermediary application 1112 may include an application that operates on the mobile communication device 1110 that provides a user interface for consumer interaction (e.g., to enter and view information) and communication with the trusted intermediary computer.

The trusted intermediary application may be launched on the mobile communication device 1110 and may allow a user to input a pairing identifier and generate a pairing request to indirectly pair the trusted device (e.g., mobile communication device) with an untrusted device through a controller of the untrusted device (e.g., untrusted device controller) and a trusted intermediary computer. Further, once the trusted device is paired with the untrusted device through the device controller, the trusted intermediary application may be used to generate and send a transaction request to the trusted intermediary computer. The trusted intermediary application may further be configured to display responses, notifications, and any other information that is received from the trusted intermediary computer. The trusted intermediary application may use information (e.g., the pairing identifier, device identifier information, user account information, etc.) stored on any number of memories of the trusted device (e.g., the memory element 1113, a secure element 1111, etc.) or received through any number of different input components (e.g., microphone 1119, input elements 1120, display 1117, etc.) in order to complete any of the requests or steps described herein.

The memory element 1113 may also store information such as financial information, transit information (e.g., as in a subway or train pass), access information (e.g., as in access badges), etc. Financial information may include information such as bank account information, bank identification number (BIN), credit or debit card number information, tokens or account identifier substitutes, account balance information, expiration date, consumer information such as name, date of birth, etc. Any of this information may be transmitted by the mobile communication device 1110 to the trusted intermediary computer.

Information in the memory element 1113 may also be in the form of data tracks that are traditionally associated with credit cards. Such tracks include Track 1 and Track 2. Track 1 ("International Air Transport Association") stores more information than Track 2, and may contain the cardholder's name as well as account number and other discretionary data. This track is sometimes used, for example, by airlines when securing reservations with a credit card. Track 2 ("American Banking Association") is currently most commonly used for transactions. This is the track that is read by ATMs and credit card readers during transactions. The ABA (American Banking Association) designed the specifications of this track and all world banks may be configured to abide by it. It contains the cardholder's account, encrypted PIN, plus other discretionary data.

The secure element 1111 may be a secure memory on the mobile communication device 1110 such that the data contained on the secure element 1111 cannot easily be hacked, cracked, or obtained by an unauthorized entity. The secure element 1111 is used by the mobile communication device 1110 to host and store data and applications that use a high degree of security. The secure element 1111 is provided to the mobile communication device 1110 by the secure element issuer. The secure element 1111 may be either embedded in the handset of the mobile communication device 1110 or in a subscriber identity module (SIM) card that may be removable from the mobile communication device 1110. The secure element 1111 can also be included in an add-on device such as a micro-Secure Digital (microSD) card.

The secure element 1111 may also store the same information the memory element may store such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Preferably, sensitive information including financial information, account information, personal information, etc. may be stored in the secure element 1111 to ensure the data is secure from a malicious third party.

The trusted device (e.g., mobile communication device) 1110 may further include a contactless element 1115, which is typically implemented in the form of a semiconductor chip (or other data storage element) with an associated wireless transfer (e.g., data transmission) element, such as an antenna. Contactless element 1115 is associated with (e.g., embedded within) mobile communication device 1110 and data or control instructions transmitted via a cellular network may be applied to contactless element 1115 by means of a contactless element interface (not shown). The contactless element interface functions to permit the exchange of data and/or control instructions between the mobile communication device circuitry (and hence the cellular network) and an optional contactless element 1115.

Contactless element 1115 is capable of transferring and receiving data using a NFC capability (or NFC medium) typically in accordance with a standardized protocol or data transfer mechanism (e.g., ISO 14443/NFC). Mobile communication devices 1110 that support mobile contactless payments typically support contactless transactions using the EMV contactless communication protocol (EMV-CCP), which is based on ISO 14443, in order to interact with merchant access devices. This capability is typically met by implementing NFC. The NFC capability on the mobile communication device 1110 might be enabled by an embedded NFC chip or by the addition of an external memory card or accessory that contains the NFC chip. NFC capability is a short-range communications capability, such as RFID, Bluetooth™, infra-red, or other data transfer capability that can be used to exchange data between the mobile communication device 1110 and an interrogation device. Thus, the mobile communication device 1110 is capable of communicating and transferring data and/or control instructions via both cellular network and near-field communications capability.

The trusted device (e.g., mobile communication device) 1110 may also include a processor 1114 (e.g., a microprocessor) for processing the functions of the mobile communication device 1110 and a display 1117 to allow a consumer to see phone numbers, device pairing confirmations, transaction responses, and other information and messages. The mobile communication device 1110 may further include input elements 1120 to allow a consumer to input information into the device, a speaker 1118 to allow the consumer to hear voice communication, music, etc., and a microphone 1119 to allow the consumer to transmit his or her voice through the mobile communication device 1110. The mobile communication device 1110 may also include an antenna 1116 for wireless data transfer (e.g., data transmission).

Specific details regarding some of the above-described aspects are provided below. The specific details of the specific aspects may be combined in any suitable manner without departing from the spirit and scope of embodiments of the invention.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary.

What is claimed is:

1. A method of indirectly pairing a trusted device with an untrusted device, the method comprising:
    obtaining, by the trusted device, a pairing identifier provided by the untrusted device, wherein the untrusted device sends a pairing identifier request to an untrusted device controller, wherein the untrusted device controller sends the pairing identifier to the untrusted device and sends the pairing identifier and an untrusted device controller identifier to a trusted intermediary, and wherein the trusted intermediary stores the pairing identifier and the untrusted device controller identifier, one in association with the other, in a pairing identifier database;
    sending, by the trusted device, a pairing request including the pairing identifier to an intermediary computer, wherein the intermediary computer extracts the pairing identifier from the pairing request, searches the pairing identifier database for a matching pairing identifier, and sends the pairing request to the untrusted device controller associated with the matching pairing identifier;
    receiving, by the trusted device, a pairing confirmation from the intermediary computer indicating that the trusted device is indirectly paired to the untrusted device such that the trusted device can complete a transaction with the untrusted device without communicating transaction information to the untrusted device;
    sending by the trusted device, a transaction request for the transaction with the untrusted device to the intermediary computer, wherein the intermediary computer sends the transaction request to the untrusted device controller; and
    receiving, by the trusted device, a transaction response from the intermediary computer indicating that the transaction is completed, wherein the intermediary computer receives a response associated with the transaction request from the untrusted device controller, the transaction response based on the response from the untrusted device controller.

2. The method of claim 1, further comprising
    displaying, by the trusted device, the pairing confirmation, wherein the pairing confirmation includes an identifier of the untrusted device, wherein the pairing request includes the identifier of the untrusted device.

3. The method of claim 1, further comprising
    displaying, by the trusted device, the transaction response, wherein the transaction response includes an account number, wherein the transaction request includes the account number.

4. The method of claim 1, wherein the intermediary computer receives the transaction request from the trusted device and sends the transaction request to the untrusted device controller based on the trusted device being indirectly paired to the untrusted device.

5. The method of claim 1, wherein the obtaining of the pairing identifier provided by the entrusted device comprises capturing a QR code displayed by the untrusted device.

6. The method of claim 1, wherein the pairing request further includes one or more of:
    an untrusted device identifier, a zip code, a trusted device identifier, an account identifier, a PIN, or a transaction amount.

7. The method of claim 1, further comprising:
displaying a transaction template, the transaction template based on the pairing confirmation, and
obtaining transaction details including an account number, wherein the transaction request is based on the transaction details.

8. A computer comprising:
a processor; and
a computer readable medium coupled to the processor, the computer readable medium comprising code for implementing a method of indirectly pairing a trusted device with an untrusted device, the code, when executed by the processor, causing the processor to:
obtain a pairing identifier provided by the untrusted device, wherein the untrusted device sends a pairing identifier request to an untrusted device controller, wherein the untrusted device controller sends the pairing identifier to the untrusted device and sends the pairing identifier and an untrusted device controller identifier to a trusted intermediary, and wherein the trusted intermediary stores the pairing identifier and the untrusted device controller identifier, one in association with the other, in a pairing identifier database,
send a pairing request including the pairing identifier to an intermediary computer, wherein the intermediary computer extracts the pairing identifier from the pairing request, searches the pairing identifier database for a matching pairing identifier, and sends the pairing request to the untrusted device controller associated with the matching pairing identifier,
receive a pairing confirmation from the intermediary computer indicating that the trusted device is indirectly paired to the untrusted device such that the trusted device can complete a transaction with the untrusted device without communicating transaction information to the untrusted device,
send a transaction request for the transaction with the untrusted device to the intermediary computer, wherein the intermediary computer sends the transaction request to the untrusted device controller, and
receive a transaction response from the intermediary computer indicating that the transaction is completed, wherein the intermediary computer receives a response associated with the transaction request from the untrusted device controller, the transaction response based on the response from the untrusted device controller.

9. The computer of claim 8, further comprising
a display, wherein the code, when executed by the processor, further causes the processor to:
display, on the display, the pairing confirmation, wherein the pairing confirmation includes an identifier of the untrusted device, wherein the pairing request includes the identifier of the untrusted device.

10. The computer of claim 8, further comprising
a display, wherein the code, when executed by the processor, further causes the processor to:
display, on the display, the transaction response, wherein the transaction response includes an account number, wherein the transaction request includes the account number.

11. The computer of claim 8, further comprising
a display, wherein the code, when executed by the processor, further causes the processor to:
display, on the display, a transaction template, the transaction template based on the pairing confirmation, and obtain transaction details including an account number, wherein the transaction request is based on the transaction details.

12. The computer of claim 8, wherein the obtaining of the pairing identifier provided by the untrusted device comprises capturing a QR code displayed by the untrusted device.

13. The computer of claim 8, wherein the pairing request further includes one or more of: an untrusted device identifier, a zip code, a trusted device identifier, an account identifier, a PIN, or a transaction amount.

14. The computer of claim 8, wherein the intermediary computer
receives the transaction request from the trusted device and
sends the transaction request to the untrusted device controller based on the trusted device being indirectly paired to the untrusted device.

* * * * *